US009893744B1

(12) United States Patent
Patel et al.

(10) Patent No.: US 9,893,744 B1
(45) Date of Patent: Feb. 13, 2018

(54) MODIFICATION OF DEFAULT PRIORITIES FOR COMMUNICATIONS IN OVERLAPPING FREQUENCIES

(71) Applicant: Amazon Technologies, Inc., Seattle, WA (US)

(72) Inventors: Pratik Kalpesh Patel, Sunnyvale, CA (US); Jay Praful Desai, San Jose, CA (US); Qinghai Gao, Sunnyvale, CA (US); Morris Yuanhsiang Hsu, Sunnyvale, CA (US); Ateet Kapur, San Francisco, CA (US); Milos Jorgovanovic, Mountain View, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/385,831

(22) Filed: Dec. 20, 2016

Related U.S. Application Data

(60) Provisional application No. 62/406,871, filed on Oct. 11, 2016.

(51) Int. Cl.
*H04B 7/00* (2006.01)
*H04B 1/00* (2006.01)
*H04B 7/26* (2006.01)

(52) U.S. Cl.
CPC ............ *H04B 1/0064* (2013.01); *H04B 7/26* (2013.01)

(58) Field of Classification Search
CPC .................. H04B 1/0064; H04B 7/26
(Continued)

(56) References Cited

U.S. PATENT DOCUMENTS 8,670,780 B2 * 3/2014 Hakola ............... H04W 16/14
455/446
8,837,401 B2 * 9/2014 Immonen ............ H04B 1/525
370/329

(Continued)

OTHER PUBLICATIONS

Office action for U.S. Appl. No. 15/385,807, dated Jun. 27, 2017, Hsu, "RH—Sonar—Packet Traffic Arbitration between Wifi, BT, and Zigbee (Next-Packet Protection)", 8 pages.

*Primary Examiner* — April G Gonzales
(74) *Attorney, Agent, or Firm* — Lee & Hayes, PLLC

(57) ABSTRACT

Techniques for harmonizing wireless communications performed by a computing device which communicates using varying wireless communication standards are described herein. For instance, a computing device may include multiple chipsets with associated antennas that are configured to perform wireless communications using separate wireless standards which operate at overlapping frequencies. To avoid performance degradation experienced in simultaneous use cases with communications operating at overlapping frequencies, the multiple chipsets may be configured with logic to determine which communications are prioritized when multiple chipsets attempt to communicate simultaneously. The multiple chipsets may be communicatively coupled to coordinate their communications by prioritizing certain types of communications over other types of communications to avoid simultaneous communications in overlapping frequencies. In this way, multiple chipsets that communicate using different standards at overlapping frequencies may avoid performance issues experienced in simultaneous use cases, while performing the communications which are of a highest priority level.

20 Claims, 17 Drawing Sheets

(58) Field of Classification Search
USPC .......................................................... 455/41.2
See application file for complete search history.

(56) References Cited

U.S. PATENT DOCUMENTS

| | | | | |
|---|---|---|---|---|
| 8,897,220 | B2* | 11/2014 | Kadous | ............. H04W 72/1215 370/328 |
| 8,908,656 | B2* | 12/2014 | Sadek | ............... H04W 72/1215 370/252 |
| 9,232,566 | B2* | 1/2016 | Amini | ....................... H04B 1/44 |
| 9,265,001 | B1 | 2/2016 | Tannenbaum et al. | |
| 9,271,179 | B2* | 2/2016 | Singh | ................ H04W 28/0215 |
| 9,679,454 | B2 | 6/2017 | Mishra et al. | |
| 2004/0242159 | A1 | 12/2004 | Calderon et al. | |
| 2007/0036170 | A1 | 2/2007 | Gonikberg et al. | |
| 2008/0238807 | A1 | 10/2008 | Ibrahim et al. | |
| 2009/0257379 | A1 | 10/2009 | Robinson et al. | |
| 2012/0106419 | A1 | 5/2012 | Gonikberg et al. | |
| 2012/0250532 | A1 | 10/2012 | Husted et al. | |
| 2013/0010766 | A1* | 1/2013 | Sadek | ............... H04W 72/1215 370/336 |
| 2013/0324113 | A1 | 12/2013 | Jechoux et al. | |
| 2014/0056288 | A1 | 2/2014 | Wyper et al. | |
| 2014/0302786 | A1* | 10/2014 | Kasslin | ................. H04W 8/005 455/41.2 |
| 2015/0092673 | A1* | 4/2015 | Singh | ................ H04W 28/0215 370/329 |
| 2015/0163692 | A1 | 6/2015 | Babaei | |
| 2016/0094662 | A1 | 3/2016 | Kollu et al. | |
| 2016/0095142 | A1 | 3/2016 | Chu | |
| 2016/0249373 | A1* | 8/2016 | Celebi | ............... H04W 52/0206 |

* cited by examiner

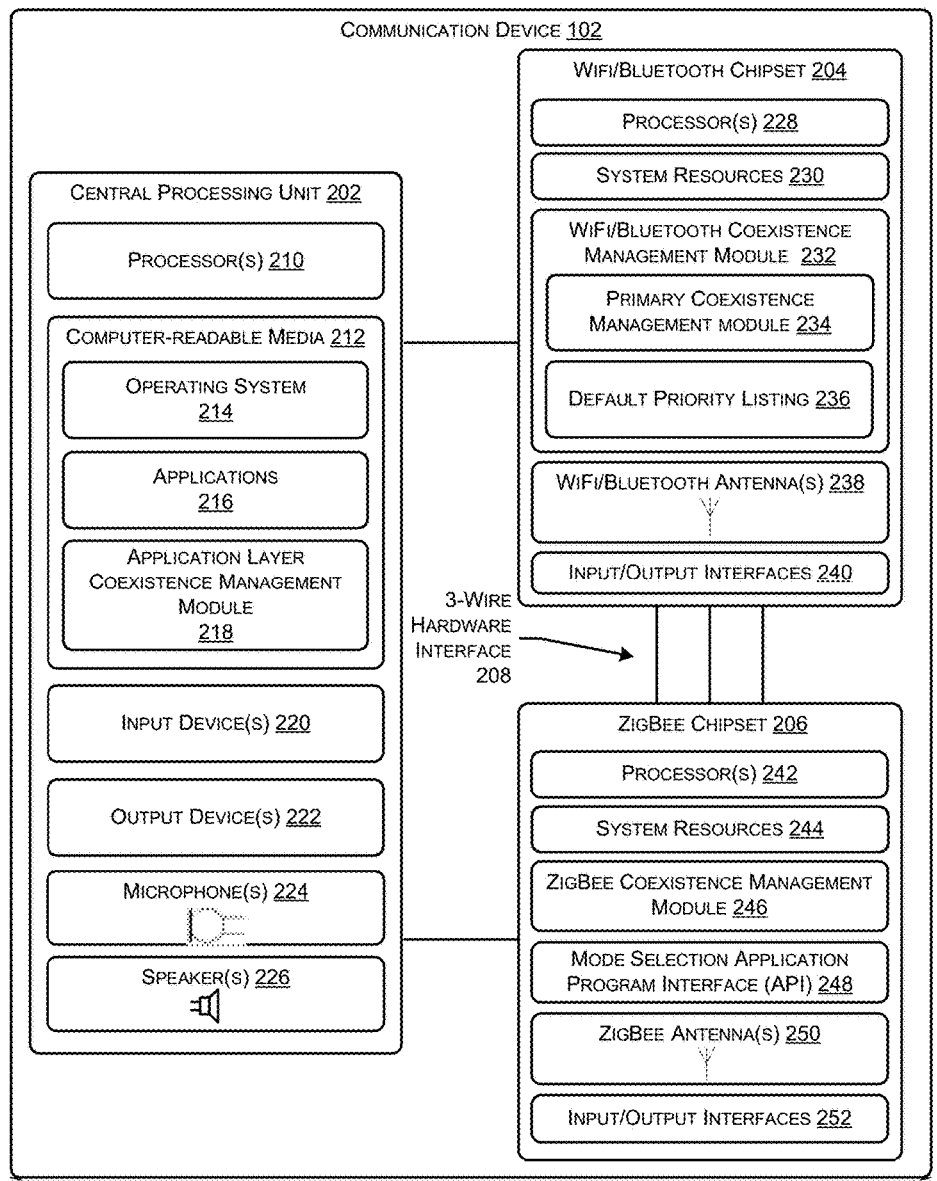
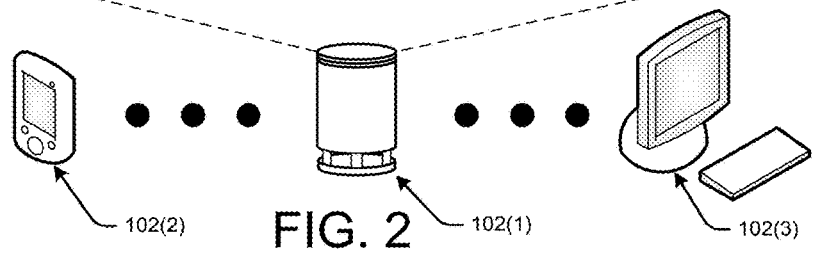
FIG. 2

MODIFICATION OF DEFAULT PRIORITIES FOR COMMUNICATIONS IN OVERLAPPING FREQUENCIES

RELATED APPLICATION

This application claims the benefit of priority to provisional U.S. Patent Application Ser. No. 62/406,871, filed on Oct. 11, 2016, which is herein incorporated by reference in its entirety.

BACKGROUND

As the capabilities of computing devices continue to evolve, the desire for increased network communication between these devices has increased.

Advancements and developments in device communications, such as the Internet of things (IoT), illustrate the desire to increase the network connectivity between computing devices. However, many computing devices are unable to communicate due to the use of different wireless communication standards. To increase communication between computing devices using different wireless communication standards, multiple communication chips and antennas configured to communicate using varying wireless communication standards may be installed in computing devices.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 2 shows a functional block diagram of selected components implemented at a computing device, such as the communication device of FIG. 1.

DETAILED DESCRIPTION

Figure 1:
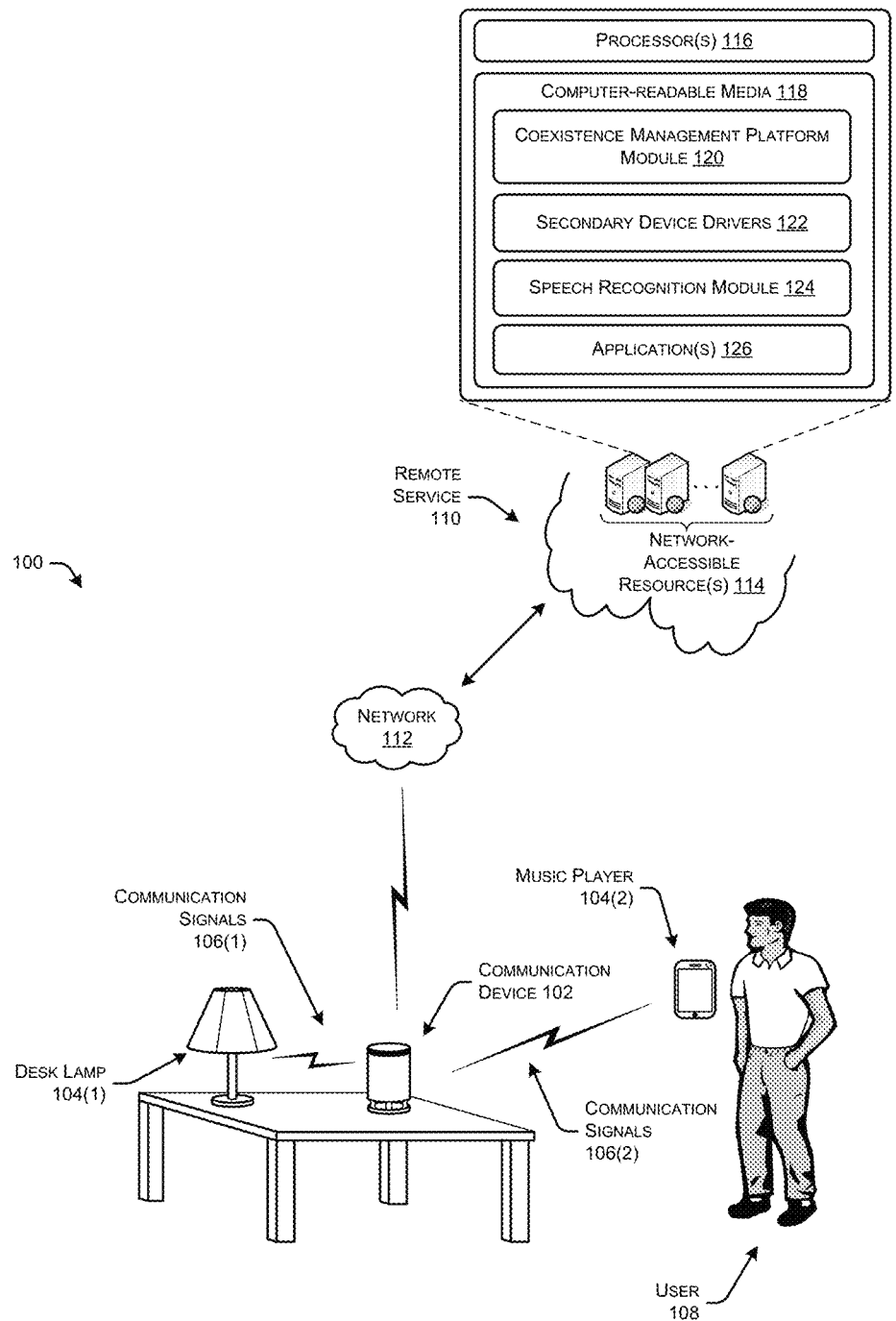
FIG. 1 is a schematic diagram of an illustrative environment in which a communication device communicates with various devices using different communication standards.

Techniques for harmonizing wireless communications performed by a computing device having multiple communication chipsets which use varying wireless communication standards are described herein. For instance, a computing device may include multiple chipsets which each have antennas capable of coupling to a network (e.g., LAN, WAN, etc.) to perform wireless communications (e.g., over WiFi) with other devices, and/or perform wireless communications with other devices via short-range wireless radio communication standards or protocols (e.g., Bluetooth®, ZigBee®, etc.). In some instances, the communication standards may operate in frequency ranges or at frequencies that partially or completely overlap (e.g., 2.4 GHz), which may result in communication performance issues during simultaneous use cases.

In some instances, a computing device may have one or more chipsets installed for communicating using WiFi and Bluetooth® (e.g., a "WiFi/BT chipset"). For instance, a computing device may include a WiFi/BT chipset which may comprise separate chips with associated antennas to perform communications using these differing communication standards, or a combo chipset with one or more associated antennas. The WiFi/BT chipset may have a coexistence management module encoded thereon or otherwise stored on the chipset to manage communications performed by the WiFi/BT chipset using the WiFi standard and the Bluetooth® standard. The WiFi/BT coexistence management module may include priority listings for which types of communications performed by the WiFi/BT receive priority during simultaneous use cases. For example, a communication type for establishing an Internet connection using the WiFi communication standard may take priority over a communication for receiving audio data from a secondary device using a Bluetooth® communication standard.

With the proliferation of "smart appliances" or "smart devices," which often communicate using the ZigBee® standard (or other IEEE standard, such as an IEEE 802.15 standard, IEEE 802.15.4 standard, etc.), additional chipsets configured to communicate with these devices may be desirable. In some examples, the computing device that includes the WiFi/BT chipset may further comprise a ZigBee® chipset configured to communicate using the ZigBee® standard via one or more associated antennas. However, as noted above, a computing device attempting to communicate via various chipsets and antennas using these separate communication standards may suffer from poor performance in simultaneous use cases due to the standards communicating signals which operate in frequency ranges that at least partially overlap.

In some examples, the priority listing of the WiFi/BT coexistence management module may further include a listing of indications of priorities for communications performed by the ZigBee® chipset along with the communications performed by the WiFi/BT chipset. This priority listing may indicate which types of communications performed by the WiFi/BT chipset and/or the ZigBee® chipset receive priority during simultaneous use cases to improve the communications performed by the computing device. For example, a Bluetooth® hands-free profile communication type may receive priority over a ZigBee® chipset communication type for receiving data. However, the ZigBee® chipset communication type for receiving data may receive priority over a Bluetooth® advanced audio distribution profile (A2DP) communication type for streaming audio data between a secondary device and the computing device.

In some examples the WiFi/BT chipset may be an individual WiFi chip with associated antenna(s) and an individual BT chip with associated antenna(s), or a combo WiFi/BT chipset with associated antennas. Additionally, the ZigBee® chipset may be an individual chipset with associated antennas. As noted above, the WiFi/BT chipset may be encoded with a coexistence management module to arbitrate between requests to communicate using a default priority listing. In this example, the WiFi/BT chipset may serve as the "master" chipset, and receive a request from the ZigBee® chipset, which may serve as the "slave" chipset, indicating that the ZigBee® chipset would like to communicate with a secondary device. The ZigBee® chipset may include a ZigBee® coexistence management module configured to determine that the ZigBee® chipset would like to communicate with a secondary device, and send the request to the WiFi/BT chipset. The ZigBee® coexistence management module may further determine a type of communication (e.g., receive data, transmit data, etc.) that the ZigBee® chipset is requesting to perform, and send an indication of the type of communication to the WiFi/BT chipset. In response to receiving the request and based on a priority level of the type of communication, the WiFi/BT coexistence management module may determine whether to allow the ZigBee® chipset to perform the requested communication using the default priority listing. For instance, if the WiFi/BT chipset is not currently communicating, or if the priority level of the type communication the ZigBee® chipset is requesting to communicate is a higher priority level than a communication currently being performed by the WiFi/BT chipset, then the WiFi/BT coexistence module may grant the request from the ZigBee® chipset to communicate and stop (or slow) any WiFi/BT communication being performed. Alternatively, the WiFi/BT coexistence management module may determine, based on the priority level of the type of communication the ZigBee® chipset is requesting to perform and the default priority listing, that a communication being performed by the WiFi/BT chipset is of a higher priority. In these instances, the WiFi/BT chipset will not grant the request from the ZigBee® chipset to communicate.

In order to communicate the request, the indication of the type of communication, and the grant between the WiFi/BT chipset and the ZigBee® chipset, a wire hardware interface may electrically connect the WiFi/BT chipset and the ZigBee® chipset to allow the communication between the chipsets. In some examples, a three-wire hardware interface may connect the two chipsets to facilitate communication and coordination between the chipsets. As explained above, the ZigBee® chipset may include a ZigBee® coexistence management module configured to determine that the ZigBee® chipset would like to communicate with a secondary device, determine a type of the communication, and send a request along with the indication of the type of the communication to the WiFi/BT chipset using the three-wire hardware interface. For example, the ZigBee® chipset may receive a packet from a secondary device and determine that it will be receiving data, or determine to transmit a packet to a secondary device. In response to these events, the ZigBee® chipset may send a request to communicate to the WiFi/BT chipset by placing (e.g., pulling, sending, asserting, etc.) a logic "high" signal via a first wire of the three-wire interface (e.g., conductor interface). Additionally, the ZigBee® chipset may send an indication of a type of communication that is being requested to be performed. For example, a request by the ZigBee® chipset to receive data from a secondary device may be indicated by placing a logic "high" signal via a second wire of the three-wire hardware interface, and a request by the ZigBee® chipset to transmit data to a secondary device may be indicated by placing a logic "low" signal via the second wire. Upon detecting or receiving the request and the indication of the type of communication, the WiFi/BT coexistence management module may determine whether to grant the request to communicate using the default priority listing. If the WiFi/BT coexistence management module determines to grant the request, it may cause the WiFi/BT chipset to place a logic "high" signal via a third wire of the three-wire hardware interface, which indicates to the ZigBee® chipset it may begin performing the requested communication. If the WiFi/BT coexistence management module places the logic low signal on the third wire, the WiFi/BT chipset may stop (or slow) any communication it is performing to allow the ZigBee® chipset to communicate.

As described herein, a logic high signal generally comprises a signal which is above or below neutral (e.g., ±2.5 volt, ±5 volts, etc.), whereas a logic low signal generally comprises a signal at or near neutral (e.g., 0 volts, ±1 volts, etc.). While many of the techniques for sending and receiving the request, priority, and grant indications are described with reference to placing logic high or low signals on wires connecting the WiFi/BT chipset and the ZigBee® chipset, any other method for communicating the request, priority, and grant indications may be used. For instance, one or more wires may be disposed between the two chipsets, and one or more data packets may be sent between the WiFi/BT chipset and the ZigBee® chipset to communicate the request, the indication of the type of communication, and the grant.

In some examples, arbitrating between various communications to prevent simultaneous use cases using only the default priority listing may be too rigid and may require additional communication timing rules to further enhance the harmonization of communications performed by the WiFi/BT chipset and the ZigBee® chipset. For example, due to the default priority listing, the ZigBee® chipset may be performing a significant amount of communications which prevent lower priority level WiFi/BT chipset communications from being performed. Alternatively, a strict application of the default priority listing may result in a significant amount of higher priority level WiFi/BT communication preventing the ZigBee® chipset from performing lower level priority communications. In such situations, additional timing rules may be implemented in the ZigBee® coexistence management module.

In some examples, the additional timing rules implemented by the ZigBee® coexistence management module may be applied to prevent the ZigBee® chipset from stopping lower level communications performed by the WiFi/BT chipset from being improperly interrupted. For example, the ZigBee® chipset may detect a ZigBee® packet preamble being communicated. In response to detecting the preamble, the ZigBee® coexistence management module may set the request wire to logic high. However, in some examples the computing device which contains the ZigBee® chipset may not be the intended target for the ZigBee® packet. Rather than automatically changing the priority wire to logic high and potentially improperly stopping a communication being performed by the WiFi/BT chipset if the computing device is not the intended target, the ZigBee® coexistence management module may first analyze or decode a portion of the packet of the received ZigBee® packet to determine if a destination address in the packet corresponds to the computing device. In response to determining that the destination address in the portion of the received packet corresponds to the computing device, the ZigBee® coexistence management module may send a high priority to the WiFi/BT chipset indicating it would like to receive data. In some examples, the WiFi/BT chipset may additionally wait to send the request until the destination address is determined to correspond to the computing device which includes the ZigBee® chipset.

In various examples, the ZigBee® coexistence management module may implement additional rules for protecting expected next packets. For instance, after detecting the destination address of the computing device in the preamble of the received packet and sending the request and priority level, the WiFi/BT chipset may stop communicating to allow the ZigBee® chipset to receive data. However, in some examples the WiFi/BT chipset may not stop communication quickly enough for the ZigBee® chipset to receive the data. This may result in one or more packets of the data to be received by the ZigBee® chipset to be missed or corrupted. In such examples, the ZigBee® chipset may refrain from sending an acknowledgment packet to the secondary device which sent the data to the ZigBee® chipset. If the ZigBee® chipset does not send an acknowledgement packet to the secondary device to let the secondary device know it received the data packet, then the ZigBee® coexistence management module may assume that the secondary device will try to resend the data again and expect another packet from the secondary device. In such examples, the ZigBee® chipset may keep the request as logic high on the request wire of the three-wire interface, but drop the priority level to logic low on the priority wire to allow the WiFi/BT chipset to perform communications while the ZigBee® chipset waits for the next packet. In response to detecting the preamble of the next packet, the ZigBee® coexistence management module may then set the priority level to logic high before decoding the packet in order to ensure the WiFi/BT chipset stops any communication in time to allow the ZigBee® chipset to receive the data packets without corruption or loss of data. In this way, the ZigBee® chipset will avoid interfering with lower level communications performed by the WiFi/BT chipset when high amounts of ZigBee® communication traffic is occurring, but the communications are not intended for the computing device.

In addition to the next packet protection rules used when the ZigBee® chipset is receiving data from a secondary device, the ZigBee® coexistence management module may further implement rules for protecting expected next packets when the ZigBee® chipset is transmitting or sending data to a secondary device. For example, the ZigBee® device may be transmitting data (i.e., low priority communication) to a secondary device. After completing the transmit of data to the secondary device, the ZigBee® chipset may receive a media access control (MAC) layer acknowledgement packet from the secondary device indicating that the secondary device has received the data from the ZigBee® chipset. In some examples, the secondary device may be a type of device which also provides an application layer acknowledgement packet in addition to the MAC layer acknowledgement packet. The ZigBee® coexistence management module may be configured to determine a device type of the secondary device, and based on the device type, determine that the secondary device will provide an application layer acknowledgement packet as well. In such instances, the ZigBee® coexistence management module may cause the ZigBee® chipset to maintain the request as logic high in anticipation of the application layer acknowledgement packet and to protect reception of the application layer acknowledgement packet. Once the application layer packet is received, the ZigBee® coexistence management module may place a logic high signal on a wire and send an acknowledgement packet to the secondary device (assuming grant has been sent by the WiFi/BT chipset) to indicate that the ZigBee® chipset received the application layer acknowledgement packet. Once the acknowledgement packet is sent to the secondary device, the request and priority level may both return to logic low.

In various instance, the WiFi/BT coexistence management module and the ZigBee® coexistence management module may each be encoded or stored on their respective chipsets as hardware and/or firmware. These modules may be considered "low level" intelligence which applies a more rigid set of rules. In some examples, an application layer coexistence management module may be stored as computer-readable instructions (i.e., software) on a central processing unit (CPU) or system-on-a-chip (SoC) of the computing device that includes the WiFi/BT chipset and the ZigBee® chipset. The application layer coexistence management module stored on the CPU may interface with the coexistence management modules of the WiFi/BT chipset and ZigBee® chipset and may be a "high level" intelligence which circumvents or modifies the rules of the WiFi/BT and ZigBee® coexistence management modules based on high level data or events.

In some examples, the application layer coexistence management module may temporarily modify or change the default priority listings based on the high level events or data. For instance, the application layer coexistence management module may attempt to determine an intent of a user based on the types of devices trying to communicate with the computing device. As an example, a user of the computing device may be performing a phone call using a Bluetooth® hands-free profile of the WiFi/BT chipset. While the WiFi/BT chipset is performing this communication, the ZigBee® chipset of the computing device may receive a data packet from a ZigBee® device, such as a recognized key fob associated with another user, indicating that the other user is attempting to unlock a door handle. Using the default priority listing of the WiFI/BT coexistence management modules, the ZigBee® chipset may be unable to send an instruction to the door handle to cause the handle to unlock due to the Bluetooth® hands-free profile having a higher priority than a transmit communication type of the ZigBee® chipset. In such an example, the application layer coexistence management module may determine the device type of the door handle and/or the key fob and temporarily modify or change the default priority listings elevate the priority level of the ZigBee® transmit communication type, and/or lower the priority level of the Bluetooth® hands-free profile of the WiFi/BT chipset. In this way, the application layer coexistence management module may determine to modify priority levels by determining intents of one or more users based on device types of the secondary devices communicating with the chipsets of the computing device.

The techniques described herein affect computing device communications in various ways. As noted above, computing devices which communicate using various standards in overlapping frequencies may experience performance issues in simultaneous use cases. For example, simultaneous communication using communications with overlapping frequencies may result in lost or corrupt data packets, as well as noisy data. The techniques described herein include arbitration rules for the communication of packets in overlapping frequencies. For example, the techniques described herein may include determining priorities for various communication types and selecting higher priority level communications to be performed when multiple communications types are requested to be performed. In this way, a computing device may perform the highest priority communication, which may increase user satisfaction and device performance, while avoiding lost or corrupt data packets which occur during simultaneous communication in technologies that use overlapping frequency ranges to communicate.

While the techniques described herein are explained with respect to Wifi (i.e., IEEE 802.11 standard), Bluetooth®, and ZigBee® (i.e., IEEE 802.15.4 standard), the techniques may be applied in any type of communications to provide packet arbitration with communication standards that operate in overlapping frequencies or frequency ranges. Using the techniques described herein, a computing device may communicate using communication standards which operate at overlapping frequencies while avoiding performance degradation experience in simultaneous use cases.

Further details regarding the default priority listing in communication arbitration, next packet protection, as well as details regarding the application layer coexistence management platform are described below. Further, while a few example secondary devices have been described, it is to be appreciated that the techniques may utilize an array of other such secondary devices, such as audio systems, locks, garage doors, washing machines, dryers, dishwashers, coffee makers, refrigerators, doors, shades, or the like. Each of these secondary devices may communicatively couple to a communication device, such as the computing device described above. Furthermore, the computing device configured to communicate with the secondary device (and configured to interact with the remote service described below) may comprise a voice-controlled device, a tablet computing device, a mobile phone, a laptop computer, a desktop computer, a set-top box, a vision-based device, or the like.

FIG. 1 is a schematic diagram of an example environment 100 in which a communication device 102 communicates with one or more secondary devices, in this example comprising a desk lamp 104(1) and a music player 104(2). FIG. 1 is provided to aid in comprehension of the disclosed techniques and systems. As such, it should be understood that the discussion that follows is non-limiting.

As described above, the communication device 102 may include a WiFi/BT chipset and associated antennas configured to communicate with secondary devices using WiFi or Bluetooth® standards, and a ZigBee® chipset and associated antennas configured to communicate with secondary devices using the ZigBee® standard. In various examples, the WiFi/BT chipset may include a WiFi/BT coexistence management module and the to determine priorities for communications performed by the communication device 102 based on a default priority listing.

As shown in FIG. 1, a communication device 102 may receive or send one or more communication signals 106(1) and 106(2) to communicate with desk lamp 104(1) and music player 104(2), respectively. For example, the communication device 102 may be receiving audio data represented in the communication signals 106(2) from the music player 104(2), and playing or outputting sound based on the audio data via a speaker of the communication device 102. In some instances, the WiFi/BT chipset of the communication device 102 may be receiving the audio data from the music player 104(2) in the communication signals 106(2) using a Bluetooth® advanced audio distribution profile (A2DP) communication type for streaming audio. While the communication device 102 is streaming the audio from the music player 104(2) via the communication signals 106(2), a user 108 of the communication device may issue a voice command to the communication device 102 to "turn on my desk lamp." Multiple other voice commands are possible, such as "dim my desk lamp" or, in the case of other secondary devices, "close my garage door", "mute my television", "turn on my stereo", or the like. The communication device 102 may interpret or process the voice command of the user and determine an instruction to cause the desk lamp 104(1) to turn on. In some examples, the desk lamp 104(1) may be a smart appliance which communicates using the ZigBee® standard. The communication device 102 may instruct the ZigBee® chipset to transmit data (e.g., a command to perform an operation) to the desk lamp 104(1) using the one or more associated antennas. The ZigBee® chipset may include a ZigBee® coexistence module which determines and sends a request and a priority level to the WiFi/BT chipset indicating that the ZigBee® chipset would like to transmit data to the desk lamp 104(1).

In some examples, the WiFi/BT coexistence management module may determine, based on the default priority listing, that the request from the ZigBee® chipset to transmit data is a higher priority than the streaming of the audio data in the communication signals 106(2) from the music player 104(2). In such examples, the WiFi/BT chipset may determine to stop receiving the audio data included in the communication signals 106(2) and grant the request from the ZigBee® chipset to perform the requested transmit.

In other examples, the WiFi/BT coexistence management module may determine, based on the default priority listing, that the request from the ZigBee® chipset to transmit data is a lower priority than the streaming of the audio data in the communication signals 106(2) from the music player 104(2). In such examples, the WiFi/BT coexistence management module may determine to not grant the request from the ZigBee® chipset and continue to perform receive the audio data in the communication signals 106(2).

In such examples, a CPU of the communication device 102 may further store an application layer coexistence management module which determines that the intent of the user is to turn on the desk lamp 104(1), and that transmitting the data to the desk lamp 104(1) in the communication signals 106(1) and by the ZigBee® chipset is actually a higher priority to the user 108 than streaming the audio data in the communication signals 106(2). For instance, the application layer coexistence module may determine that the request from the ZigBee® chipset is associated with a command from the user 108, and elevate the priority of the request from the ZigBee® chipset to a higher priority level than the priority level of the A2DP communication type being performed by the WiFi/BT chipset. Accordingly, the WiFi/BT coexistence management module may grant the request of the ZigBee® chipset to transmit the data and cause the WiFi/BT chipset to stop receiving the audio data in the communication signals 106(2).

FIG. 1 further illustrates that the communication device 102 may couple with a remote service 110 over a network 112. The network 114 may represent an array or wired networks, wireless networks (e.g., WiFi), or combinations thereof. The remote service 110 may generally refer to a network-accessible platform—or "cloud-based service"—implemented as a computing infrastructure of processors, storage, software, data access, and so forth that is maintained and accessible via the network 112, such as the Internet. Cloud-based services may not require end-user knowledge of the physical location and configuration of the system that delivers the services. Common expressions associated with cloud-based services, such as the remote service 110, include "on-demand computing", "software as a service (SaaS)", "platform computing", "network accessible platform", and so forth.

As illustrated, the remote service 110 may comprise one or more network-accessible resources 114, such as servers. These resources 114 comprise one or more processors 116 and computer-readable storage media 118 executable on the processors 116. The computer-readable media 118 may store a coexistence management platform module 120, one or more secondary-device drivers 122, a speech-recognition module 124, and one or more applications 126. Upon the communication device 102 identifying the user 108 speaking the voice command, the communication device 102 may begin uploading an audio signal representing sound captured in the environment 100 up to the remote service 110 over the network 112. In response to receiving this audio signal, the speech-recognition module 124 may begin performing automated speech recognition (ASR) on the audio signal to identify one or more user voice commands therein. For instance, in the illustrated example, the speech-recognition module 124 may identify the user requesting to turn on the desk lamp 104(1).

Upon the identifying this voice command (initially spoken by the user 108 as a natural-language command), the remote service 110 may cause execution of a secondary device deriver 122 associated with the desk lamp 104(1) to generate a command, and send the command via the network 112 to the communication device 102. Upon receiving the command from the remote service 110, the ZigBee® coexistence management module may send the request and the priority level to the WiFi/BT chipset to communicate with the desk lamp 104(1).

In some examples, the coexistence management platform module 120 in the remote service 110 may perform portions of the operations described as being performed by the WiFi/BT coexistence management module and/or the ZigBee® coexistence management module. For instance, the coexistence management platform module 120 may store the default priority listings and determine whether to cause the secondary device drivers 122 to execute the command based on the priority levels. For instance, if the communication being performed by the WiFi/BT chipset is a higher priority than the request to turn on the desk lamp 104(1), then the coexistence management platform module 120 may determine to not execute the secondary device drivers 122 and not cause the ZigBee® chipset to communicate the instruction from the user to turn on the desk lamp 104(1). The application(s) 126 may include any type of application, such as a music application to provide audio data via the network 112 to the communication device 102.

FIG. 2 shows a functional block diagram of selected components implemented at a communication device, such as the communication device 102 of FIG. 1. The communication device 104 may be implemented as a standalone device 102(1) that is relatively simple in terms of functional capabilities with limited input/output components, memory, and processing capabilities. For instance, the voice-controlled device 102(1) does not have a keyboard, keypad, or other form of mechanical input. Nor does it have a display (other than simple lights, for instance) or touch screen to facilitate visual presentation and user touch input. Instead, the device 102(1) may be implemented with the ability to receive and output audio, a network interface (wireless or wire-based), power, and processing/memory capabilities. In certain implementations, a limited set of one or more input components may be employed (e.g., a dedicated button to initiate a configuration, power on/off, etc.). Nonetheless, the primary and potentially only mode of user interaction with the device 102(1) is through voice input and audible output. In some instances, the device 102(1) may simply comprise a microphone, a power source (e.g., a battery), and functionality for sending generated audio signals to another device.

The communication device 102 may also be implemented as a mobile device 102(2) such as a smart phone or personal digital assistant. The mobile device 102(2) may include a touch-sensitive display screen and various buttons for providing input as well as additional functionality such as the ability to send and receive telephone calls. Alternative implementations of the communication device 102 may also include configuration as a personal computer 102(3). The personal computer 102(3) may include a keyboard, a mouse, a display screen, and any other hardware or functionality that is typically found on a desktop, notebook, netbook, or other personal computing devices. The devices 102(1), 102(2), and 102(3) are merely examples and not intended to be limiting, as the techniques described in this disclosure may be used in essentially any device that has an ability to recognize speech input or other types of natural language input.

In the illustrated implementation, the communication device 102 includes a central processing unit 202, a WiFi/Bluetooth® chipset 204 configured to communicate using WiFi or Bluetooth® technologies ("WiFi/BT chipset"), and a ZigBee® chipset 206 configured to communicate using the ZigBee® standard. In the illustrated example, the WiFi/BT chipset 204 and ZigBee® chipset 206 are electrically connected by a three-wire hardware interface 208.

In some examples, the central processing unit 202 may include one or more processors 210 and computer-readable media 212. Several modules such as instruction, data stores, and so forth may be stored within the computer-readable media 212 and configured to execute on the processor(s) 210. A few example functional modules are shown as applications stored in the computer-readable media 212 and executed on the processor(s) 210, although the same functionality may alternatively be implemented in hardware, firmware, or as a system on a chip (SOC).

An operating system module 214 may be configured to manage hardware and services within and coupled to the communication device 102 for the benefit of other modules. Further, one or more applications 216 may be stored in the computer-readable media 212 to provide various service for the communication device 102, such as a music player application, a calendar application, music player, a movie player, a timer, and a personal shopper. However, the communication device 102 may include any number or type of applications and is not limited to the specific examples shown here. The music player may be configured to play songs or other audio files. The movie player may be configured to play movies or other audio visual media. The timer may be configured to provide the functions of a simple timing device and clock. The personal shopper may be configured to assist a user in purchasing items from web-based merchants.

In some examples, the computer-readable media 212 may further store an application layer coexistence management module 218 which comprises computer-readable instructions that, when executed by the processor(s) 210, perform operations for interacting with the WiFi/BT chipset 204 and the ZigBee® chipset 206. For instance, the application layer coexistence management module 218 may comprise "high level" intelligence to modify default priority listings of the WiFi/BT chipset 204 and the ZigBee® chipset 206 by changing the default priorities of various communications performed by the chipsets based on different types of data (e.g., user intent, amount of audio data in an audio buffer, etc.). The application layer coexistence management module 218 will be discussed further in FIGS. 14-17.

Generally, the communication device 102 has input devices 220 and output devices 222. The input devices 220 may include a keyboard, keypad, mouse, touch screen, joystick, control buttons, etc. In some implementations, one or more microphones 224 may function as input devices 220 to receive audio input, such as user voice input. The output devices 222 may include a display, a light element (e.g., LED), a vibrator to create haptic sensations, or the like. In some implementations, one or more speakers 226 may function as output devices 222 to output audio sounds.

A user 102 may interact with the voice-controlled device 104 by speaking to it, and the microphone(s) 224 capture the user's speech. The communication device 102 can communicate back to the user by emitting audible statements through the speaker(s) 226. In this manner, the user 108 can interact with the communication device 102 solely through speech, without use of a keyboard or display.

Accordingly, when implemented as the primarily-voice-operated communication device 102(1), there may be no input devices, such as navigation buttons, keypads, joysticks, keyboards, touch screens, and the like other than the microphone(s) 224. Further, there may be no output such as a display for text or graphical output. The speaker(s) 226 may be the main output device. In one implementation, the communication device 102(1) may include non-input control mechanisms, such as basic volume control button(s) for increasing/decreasing volume, as well as power and reset buttons. There may also be a simple light element (e.g., LED) to indicate a state such as, for example, when power is on.

Accordingly, the communication device 102(1) may be implemented as an aesthetically appealing device with smooth and rounded surfaces, with one or more apertures for passage of sound waves. The communication device 102(1) may merely have a power cord and optionally a wired interface (e.g., broadband, USB, etc.). As a result, the communication device 102(1) may be generally produced at a low cost. Once plugged in, the device may automatically self-configure, or with slight aid of the user, and be ready to use. In other implementations, other I/O components may be added to this basic model, such as specialty buttons, a keypad, display, and the like.

The WiFi/BT chipset may include one or more processors 228 and system resources 230. The system resources may generally comprise various modules (i.e., hardware, firmware, etc.) memory, communication busses, and any other type of system resources required by a communication chipset to perform operations for communicating. As described above, the WiFi/BT chipset 204 may comprise a combo chip configured to communicate using WiFi and Bluetooth, or separate chips to perform the WiFi and Bluetooth® technologies.

The WiFi/BT chipset may further include a WiFi/BT coexistence management module 232 comprising a primary coexistence management module 234 and default priority listing 236. The primary coexistence management module 234 may comprise logic to determine whether the WiFi/BT chipset is communicating, and determine a priority level of that communication based on the WiFi/BT/ZigBee® default priority listing 236. Additionally, the primary coexistence management module 234 may determine priority levels of requests received from the ZigBee® chipset 206, and determine, based on the default priority listing 236, whether to grant a request from the ZigBee® chipset 206 based on the request to communicate being a higher priority level than a communication being performed by the WiFi/BT chipset, or to not grant the request from the ZigBee® chipset based on the request being a lower level than the communication being performed by the WiFi/BT chipset. Additional details regarding the operations of the WiFi/BT coexistence management module 232 will be described in the remaining figures.

The WiFi/BT chipset 232 may further include one or more WiFi/BT antennas 238 to facilitate communications over networks and with other Bluetooth® enabled devices. For example, the antennas 238 may include one antenna for transmitting data using WiFi, one antenna for receiving data using WiFi, and one antenna for performing Bluetooth® communications. However, in other examples, the WiFi/BT chipset 238 may perform all WiFi and Bluetooth® communications using a single antenna 238, or any number of antennas 238. Additionally, the WiFi/BT chipset 232 may include one or more input and output interfaces 240 to facilitate communication with the ZigBee® chipset 206. In some examples, the input/output interfaces 240 may comprise communication ports to receive or otherwise detect signals placed on the 3-wire interface 208 (e.g., conductor interface).

In some examples, the ZigBee® chipset 206 may include one or more processors 242 and system resources 244. The system resources 244 may comprise any type of resources required by a communication chip to facilitate communication of wireless signals. The ZigBee® chipset 206 may further include a ZigBee® coexistence management module 246 which comprises logic to perform functions for communicating requests and priority levels associated with communications performed by the ZigBee® chipset 206. For example, the ZigBee® coexistence management module 246 may determine whether the ZigBee® chipset 206 is attempting to perform a transmit of data. For instance, a user 108 may issue a voice command to the communication device 102 that includes a command for an appliance in the environment 100 of the communication device 102 to perform, such as "turn on the lights" of the desk lamp 104(1). In some examples, the desk lamp 104(1) may communicate using the ZigBee® standard, and the ZigBee® chipset 206 is needed to send the command to perform the action to the desk lamp 104(1). Thus, the ZigBee® coexistence management module 246 may determine that the ZigBee® chipset 206 is attempting to perform a transmission of data. In other examples, the ZigBee® coexistence management module 246 may determine that the ZigBee® chipset 206 is required to receive data communicated using the ZigBee® standard. For instance, the ZigBee® chipset 206 may detect a packet communicated using the ZigBee® standard and determine that a secondary device is attempting to send data to the ZigBee® chipset 206 of the communication device 102. The ZigBee® coexistence management module 246 may place a logic high signal (e.g., request) via a first wire of the 3-wire hardware interface 208 which indicates to the WiFi/BT chipset 204 that the ZigBee® chipset 206 would like to communicate by receiving data. Additionally, the ZigBee® coexistence management module 246 may determine a priority level of the type of communication being requested to be performed by the ZigBee® chipset 206 depending on whether the ZigBee® chipset 206 is attempting to transmit data to a secondary device, or receive data from a secondary device. For example, the ZigBee® coexistence management module 246 may place a logic high signal on a second wire of the 3-wire hardware interface 208 if the ZigBee® chipset 206 is requesting to receive data from a secondary device, or place a logic low signal on the second wire while maintaining a logic high signal on the first wire if the ZigBee® chipset 206 is requesting to transmit data.

While the techniques are described herein with reference to wires of the 3-wire interface 208, other implementations for indicating a request, priority (e.g., transmit or receive data), and/or a grant are also within the scope of this invention. For instance, a single wire, or any combination or wires, may be used to send and receive data packets between the ZigBee® chipset 206 and the WiFi/BT chipset 204. The packets sent may include data which indicate the request, priority, and grant, or any other type of data for performing the techniques described herein. In some examples, one or more wires may be disposed and the timing, order, or number of logic high or logic low signals placed on the wire or wires may be used to indicate the request, priority, grant, or other information that may be used to coordinate communications between the ZigBee® chipset 206 and the WiFi/BT chipset 204. Additionally, although wires are described herein as being utilized for communications, in other examples, any type of conductor usable for transporting or conducting electric signals may be utilized (e.g., traces on a circuit board).

In some examples, the ZigBee® chipset 206 may further include a mode selection application program interface (API) 248 which determines a mode of the ZigBee® coexistence management module 246 that dictates timing for placing the signals indicating the request and types of communications for the ZigBee® chipset 206. Further description of the different modes that are selectable by the mode selection API 248 are described with reference to FIGS. 8-13. The ZigBee® chipset 206 may further include or be associated with one or more ZigBee® antennas 250 which facilitate communication with secondary devices using the ZigBee® standard upon receiving a grant from the WiFi/BT chipset 204. The ZigBee® chipset 206 may also include one or more input and output interfaces 252 to facilitate communication with the WiFi/BT chipset 204. In some examples, the input/output interfaces 252 may comprise communication ports to receive or otherwise detect signals placed on the 3-wire interface 208 from the WiFi/BT chipset 204, such as a grant signal placed on a third wire of the 3-wire hardware interface 208. If a grant signal is placed as logic high on the third wire, the ZigBee® chipset's request to communicate has been granted by the WiFi/BT coexistence management module 234 and the ZigBee® chipset 206 may perform communications using the ZigBee® antenna(s) 250 without interference from the WiFi/BT chipset 204.

In some implementations, the processors(s) 202 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 2202 may possess its own local memory, which also may store program modules, program data, and/or one or more operating systems.

The computer-readable media 212 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 212 may be implemented as computer-readable storage media ("CRSM"), which may be any available physical media accessible by the processor(s) 202 to execute instructions stored on the memory 212. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 210.

Figure 3:
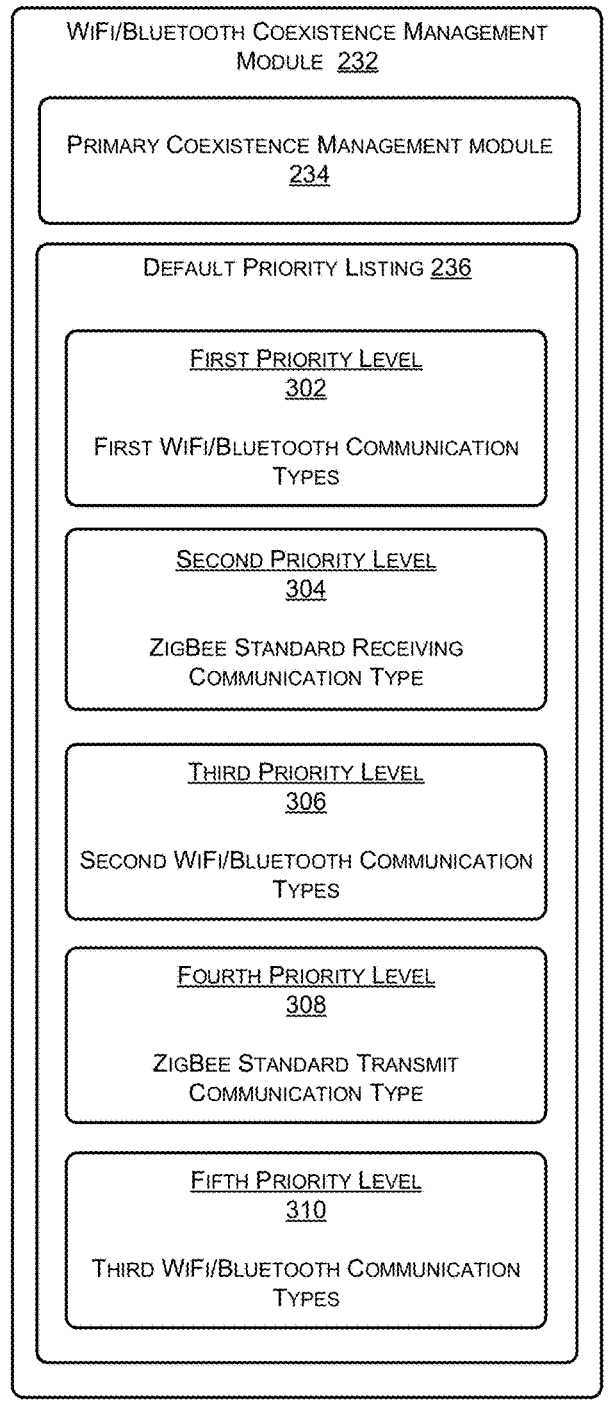
FIG. 3 illustrates example components of an example default priority listing for groupings of communication types performed by the communication device of FIG. 1.

FIG. 3 illustrates example components of a default priority listing 236 for groupings of communication types performed by the communication device of FIG. 1. As illustrated, the WiFi/BT coexistence management module 232 may be encoded with, store, or otherwise be associated with the default priority listing 236. In this way, upon receiving a request to communicate from the ZigBee® chipset 206 and a priority indication for the type of communication requested to be performed, the WiFi/BT coexistence management module 232 may determine whether to grant the request to communicate based on the default priority listing 236.

As illustrated, the default priority listing 236 may generally include five priority levels including various types of communication types. The default priority listing 236 includes a first priority level 302 which includes one or more first WiFi/BT communication types. In some examples, the first WiFi/BT communication types of the first priority level 302 may include a WiFi association communication type where the WiFi/BT chipset 204 attempts to establish a WiFi connection with a network (e.g., Internet connectivity). The first WiFi/BT communication types of the first priority level 302 may further include one or more Bluetooth® standard profiles such as a hands-free profile where a user 108 of the communication device 102 is performing communication using a hands-free device (i.e., phone call using a Bluetooth® headset). Additionally, the first WiFi/BT communication types of the first priority level 302 may include a Bluetooth® headset profile, such as where the user 108 is communicating via the communication device 102 using a Bluetooth® headset.

The default priority listing 236 may further include a second priority level 304, which is a lower priority level than the first priority level 302, which includes a ZigBee® standard receiving communication type in which the ZigBee® chipset 206 receives data from a secondary device that communicates using the ZigBee® standard (e.g., ZigBee® "High" Priority). For example, the ZigBee® chipset 206 may receive data packets from a ZigBee® standard enabled smart device, such as a key fob of a user, which sends a request to the ZigBee® chipset 206 to issue an instruction to a garage door opener to open a garage door.

The default priority listing 236 may further include a third priority level 306, which is a lower priority level than the second priority level 304, which includes one or more second WiFi/BT communication types performed by the WiFi/BT chipset 204. In some examples, the second WiFi/BT communication types of the third priority level 306 may include: (i) an advanced audio distribution profile (A2DP) for Bluetooth® defining how audio is streamed between the communication device 102 and a secondary device, (ii) a Bluetooth® page scan profile where the WiFi/BT chipset 204 listens for a device trying to page the communication device 102, (iii) a Bluetooth® inquiry profile where the WiFi/BT chipset 204 activates its receiver and listens for inquiries, (iv) a Bluetooth® human interface device profile (HID) where the WiFi/BT chipset 204 provides support for Bluetooth® devices such as mice, keyboards, etc., (v) a Bluetooth® low energy (BLE) profile which, compared to Bluetooth® classic, provides reduced power consumption, and (vi) a Bluetooth® audio/video remote control profile (AVRCP) for providing an interface for secondary devices such as televisions, Hi-fi equipment, etc. However, any other type of WiFi or Bluetooth® profiles may be include in the third priority level, and this listing is merely exemplary.

The default priority listing 236 may further include a fourth priority level 308, which is a lower priority level than the third priority level 306, which includes a ZigBee® standard transmit communication type in which the ZigBee® chipset 206 transmits or sends data to a secondary device that communicates using the ZigBee® standard (e.g., ZigBee® "Low" Priority). For example, the ZigBee® chipset 206 may transmit data packets from the communication device 102 to a secondary device which communicates using the ZigBee® standard, such as a smart light, to turn on or off the light (or another functionality, such as "dimming" the light).

The default priority listing 236 may further include a fifth priority level 310, which is a lower priority level than the fourth priority level 308, which includes one or more third WiFi/BT communication types performed by the WiFi/BT chipset 204. The third WiFi/BT communication types may include a WiFi communication type for when the WiFi/BT chipset 204 is in a connected state as most WiFi communication has a buffer and can store up data being streamed or output. The third WiFi/BT communication types may further include WiFi communication types such as beacon frames, control frames, management frames, and broadcast frames. In some examples, the third WiFi/BT communication types may include may include a Bluetooth® profile for A2DP silent packet where packets may be periodically sent to devices, such as Bluetooth® speakers, to keep the device alive.

While the default priority listing 236 is described above as having five priority levels including various communication types performed using WiFi, Bluetooth®, and ZigBee®, any amount of priority levels and groupings of communication types may be employed using the techniques described herein. The types of communications are not limited to WiFi, Bluetooth®, and ZigBee®, the types of communications included in each of the five groups are configurable and merely illustrative, and the number of groups are additionally configurable and illustrative.

Figure 4:
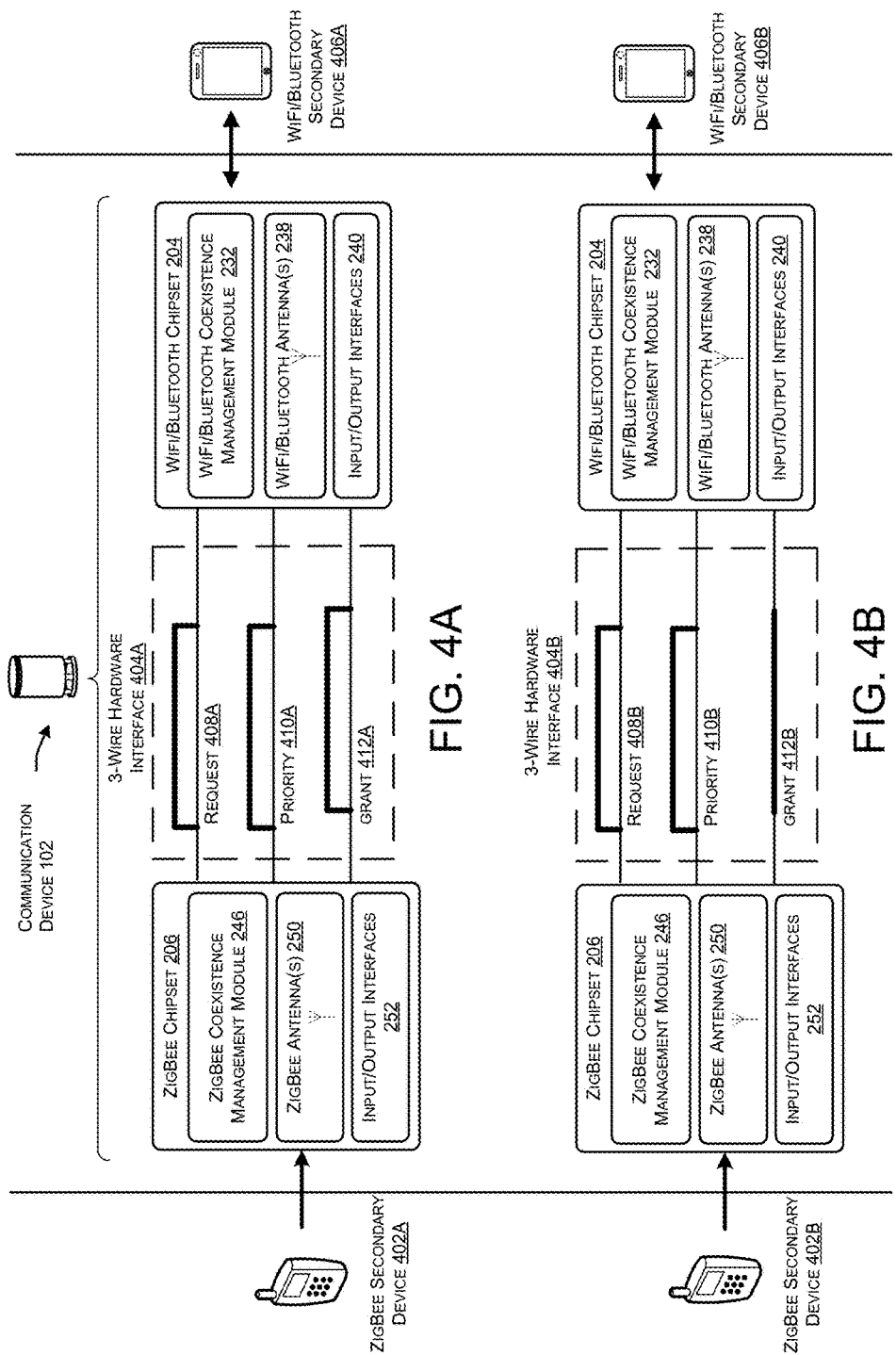
FIGS. 4A and 4B illustrate example components of the communication device of FIG. 2 for communicating requests, priority levels, and grants between a WiFi/BT chipset and a ZigBee® chipset. In this example, the ZigBee® chipset is requesting permission from the WiFi/BT chipset to receive data from a secondary device.

FIGS. 4A and 4B illustrate example components of the communication device 102 of FIG. 2 for communicating requests, types of communications, and grants between a WiFi/BT chipset and a ZigBee® chipset. In the example illustrated in FIG. 4A, the ZigBee® chipset 206 may detect or receive by the ZigBee® antenna(s) 250 one or more packets from a ZigBee® secondary device 402A, such as a remote control. As illustrated, the ZigBee® chipset 206 is electrically and communicatively coupled to the WiFi/BT chipset 204 via a 3-wire hardware interface 404A. The ZigBee® coexistence management module 246 may determine that the ZigBee® chipset 206 is going to receive data from the ZigBee® secondary device 402A and place a logic high signal indicating a request on a request wire 408A of the 3-wire hardware interface 404A. Additionally, the ZigBee® coexistence management module 246 may determine that the receiving data communication type by the ZigBee® chipset 206 is high priority, and place a logic high signal indicating a high priority on a priority wire 410A of the 3-wire hardware interface 404A. The WiFi/BT coexistence management module 232 may detect the high request and the high priority level and determine whether to allow the ZigBee® chipset 206 to receive the data. For instance, the WiFi/BT coexistence management module 232 may determine that the WiFi/BT chipset 204 is not communicating, and place a logic high signal on a grant wire 412A of the 3-wire hardware interface 404A. In another example, the WiFi/BT coexistence management module 232 may determine that the WiFi/BT chipset 204 is communicating with a WiFi/BT secondary device 406A, but that the priority level of that communication is lower than the priority level associated with receiving data at the ZigBee® chipset 206 based on the default priority listing 236. In such examples, the WiFi/BT coexistence management module 232 may also place a logic high signal on the grant wire 412A to indicate that the ZigBee® chipset 206 may receive the data by the ZigBee® antenna(s) 250 from the ZigBee® secondary device 402A. Additionally, the WiFi/BT chipset 204 may stop any communication it is performing when the grant signal is set to logic high.

Similar to FIG. 4A, FIG. 4B illustrates an example where the ZigBee® chipset 206 receives data from a ZigBee® secondary device 402B. The ZigBee® coexistence management module 246 may then place a logic high signal indicating a request on a request wire 408B of the 3-wire hardware interface 404B. Additionally, the ZigBee® coexistence management module 246 may determine that the receiving data communication type by the ZigBee® chipset 206 is high priority, and place a logic high signal on a priority wire 410B of the 3-wire hardware interface 404B. The WiFi/BT coexistence management module 232 may detect the high request and the high priority level and determine whether to allow the ZigBee® chipset 206 to receive the data. For instance, the WiFi/BT coexistence management module 232 may determine that the WiFi/BT chipset 204 is communicating with a WiFi/BT secondary device 406B, and that the priority level of that communication is higher than the priority level associated with receiving data at the ZigBee® chipset 206 based on the default priority listing 236. In such examples, the WiFi/BT coexistence management module 232 may determine to place a logic low signal (e.g., no signal) on the grant wire 412B to indicate that the ZigBee® chipset 206 may not receive the data by the ZigBee® antenna(s) 250 from the ZigBee® secondary device 402B. In this way, the WiFi/BT chipset 204 is able to finish the communication with the WiFi/BT secondary device 406B that is of a high priority level without interruption or lost and/or corrupt data.

Figure 5:
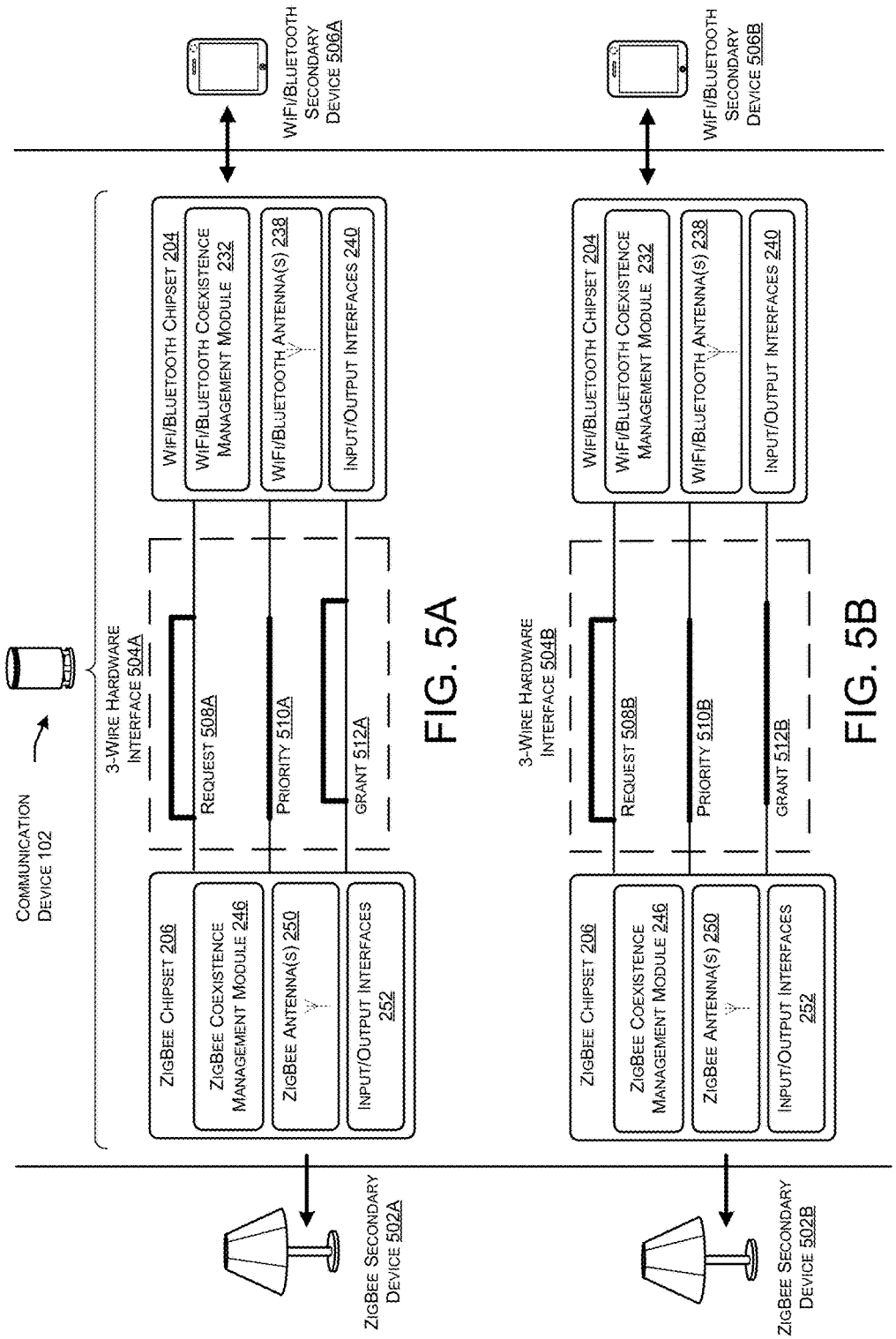
FIGS. 5A and 5B illustrate example components of the communication device of FIG. 2 for communicating requests, priority levels, and grants between a WiFi/BT chipset and a ZigBee® chipset. In this example, the ZigBee® chipset is requesting permission from the WiFi/BT chipset to transmit data to a secondary device.

FIGS. 5A and 5B illustrate example components of the communication device 102 of FIG. 2 for communicating requests, priority levels, and grants between a WiFi/BT chipset 204 and a ZigBee® chipset 206. In this example, the ZigBee® chipset 206 is requesting permission from the WiFi/BT chipset 204 to transmit data to a secondary device.

As illustrated in FIG. 5A, the ZigBee® chipset 206 may determine to transmit data to a ZigBee® secondary device 502A, such as an instruction to turn on a desk lamp. As illustrated, the ZigBee® chipset 206 may be electrically and communicatively coupled to the WiFi/BT chipset 204 via a 3-wire hardware interface 504A. The ZigBee® coexistence management module 246 may determine that the ZigBee® chipset 206 is going to transmit data to the ZigBee® secondary device 502A and place a logic high signal indicating a request on a request 508A wire of the 3-wire hardware interface 504A. Additionally, the ZigBee® coexistence management module 246 may determine that the transmitting data communication type by the ZigBee® chipset 206 is low priority, and place a logic low signal on a priority wire 510A of the 3-wire hardware interface 504A. The WiFi/BT coexistence management module 232 may detect the logic high signal and the low priority level and determine whether to allow the ZigBee® chipset 206 to transmit the data. For instance, the WiFi/BT coexistence management module 232 may determine that the WiFi/BT chipset 204 is not communicating, and place a logic high signal on a grant 512A wire of the 3-wire hardware interface 504A. In another example, the WiFi/BT coexistence management module 232 may determine that the WiFi/BT chipset 204 is communicating with a WiFi/BT secondary device 506A, but that the priority level of that communication is lower than the priority level associated with transmitting data from the ZigBee® chipset 206 to the ZigBee® secondary device 502A based on the default priority listing 236. In such examples, the WiFi/BT coexistence management module 232 may also place a logic high signal on the grant 512A wire to indicate that the ZigBee® chipset 206 may transmit the command by the ZigBee® antenna(s) 250 to the ZigBee® secondary device 502A. Additionally, the WiFi/BT chipset 204 may stop any communication it is performing when the grant signal is logic high.

Similar to FIG. 5A, FIG. 5B illustrates an example where the ZigBee® chipset 206 requests to transmit data to a ZigBee® secondary device 502B. The ZigBee® coexistence management module 246 may place a logic high signal indicating a request on a request wire 508B of the 3-wire hardware interface 504B. Additionally, the ZigBee® coexistence management module 246 may determine that the transmitting data communication type by the ZigBee® chipset 206 is low priority, and place a logic low signal on a priority wire 510B of the 3-wire hardware interface 504B. The WiFi/BT coexistence management module 232 may detect the logic high signal indicating the request and the logic low signal indicating the low priority level and determine whether to allow the ZigBee® chipset 206 to transmit the data. For instance, the WiFi/BT coexistence management module 232 may determine that the WiFi/BT chipset 204 is communicating with a WiFi/BT secondary device 506B, and that the priority level of that communication is higher than the priority level associated with transmitting data from the ZigBee® chipset 206 based on the default priority listing 236. In such examples, the WiFi/BT coexistence management module 232 may determine to place a logic low signal on the grant wire 512B to indicate that the ZigBee® chipset 206 may not transmit the data by the ZigBee® antenna(s) 250 to the ZigBee® secondary device 502B. In this way, the WiFi/BT chipset 204 is able to finish the communication with the WiFi/BT secondary device 506B that is of a high priority level without interruption or lost and/or corrupt data.

Figure 6:
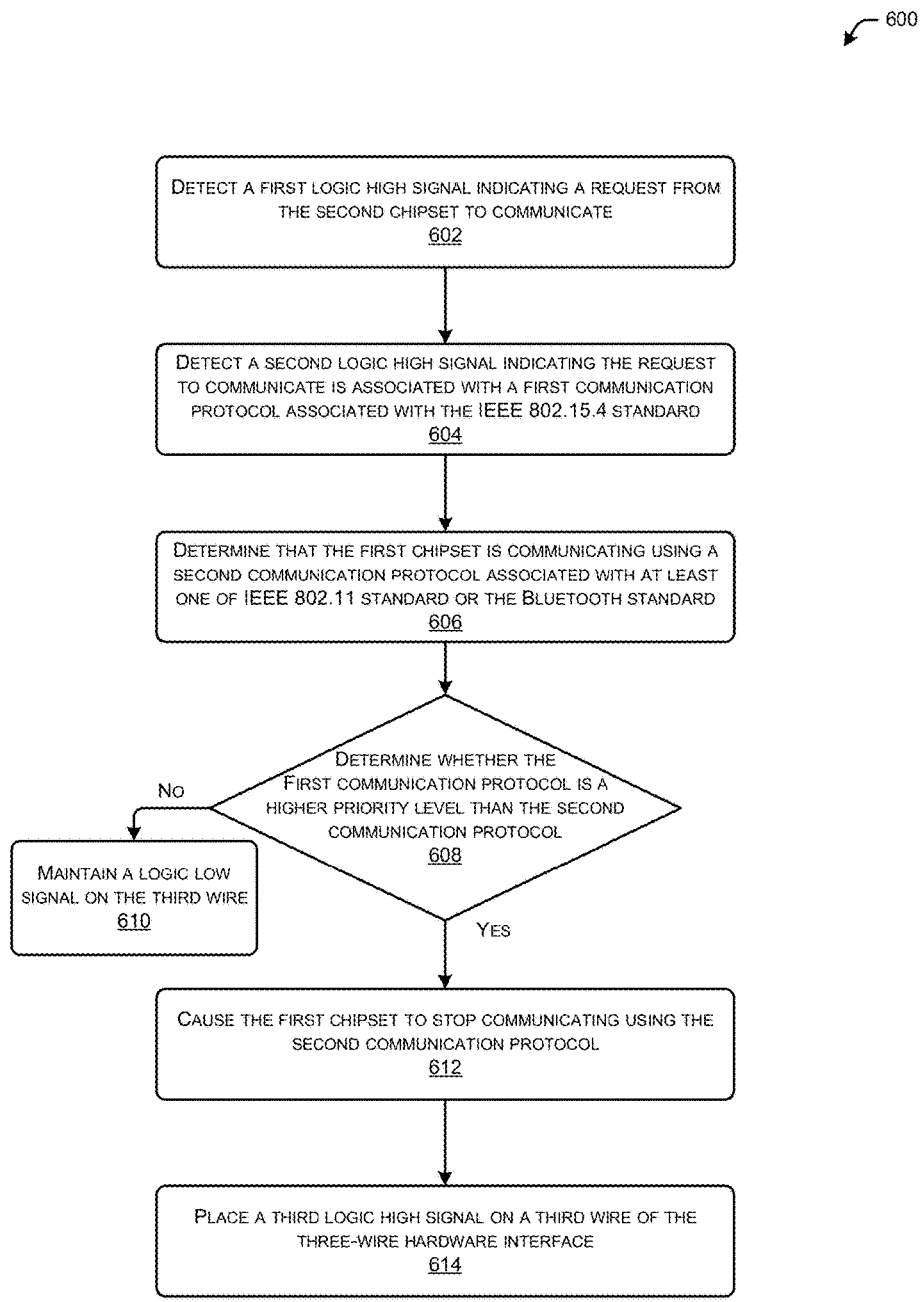
FIG. 6 is a flow diagram of an example process for determining whether to allow a second chipset communicate using a first communication protocol based on determining whether a first chipset is communicating, and on whether a priority level of the first communication protocol is higher or lower than a priority level of a second communication protocol that a first chipset is using to communicate.

FIG. 6 is a flow diagram of an example process 600 for determining whether to allow a second chipset to communicate using a first communication protocol based on determining whether a first chipset is communicating, and on whether a priority level of the first communication protocol is higher or lower than a priority level of a second communication protocol that a first chipset is using to communicate. This process (as well as each process described herein) is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

At 602, the first chipset detects a first logic high signal indicating a request from the second chipset to communicate. This request may be detected via a first conductor of a three-wire hardware interface that electrically connects the second chipset to a first chipset which is encoded with a default priority listing indicating priorities for types of communications performed by the first chipset and the second chipset.

At 604, the first chipset detects a second logic high signal indicating the request to communicate is associated with a first communication protocol associated with the IEEE 802.15.4 standard. The logic high signal may indicate that the communication requesting to be performed by the second chipset is receiving data. The second logic high signal may be detected via a second conductor of the three-wire hardware interface.

At 606, the first chipset determines that the first chipset is communicating using a second communication protocol associated with at least one of an IEEE 802.11 standard or a Bluetooth standard.

At 608, the first chipset may determine, based at least in part on the default priority listing, whether the first communication protocol is a higher priority level than the second communication protocol.

At 610, the first chipset may determine that the first communication protocol is not a higher priority level than the second communication protocol. At 610, the first chipset may maintain a logic low signal on the third conductor, which indicates that the second chipset is not allowed to communicate by the first communication protocol.

At 612, based at least in part on determining that the first communication protocol is a higher priority level than the second communication protocol, the first chipset may cause the first chipset to stop communicating using the second communication protocol. At 614, the first chipset may place a third logic high signal on a third conductor of the three-wire hardware interface. This may indicate to the second chipset that the second chipset may communicating using first communication protocol.

Figure 7:
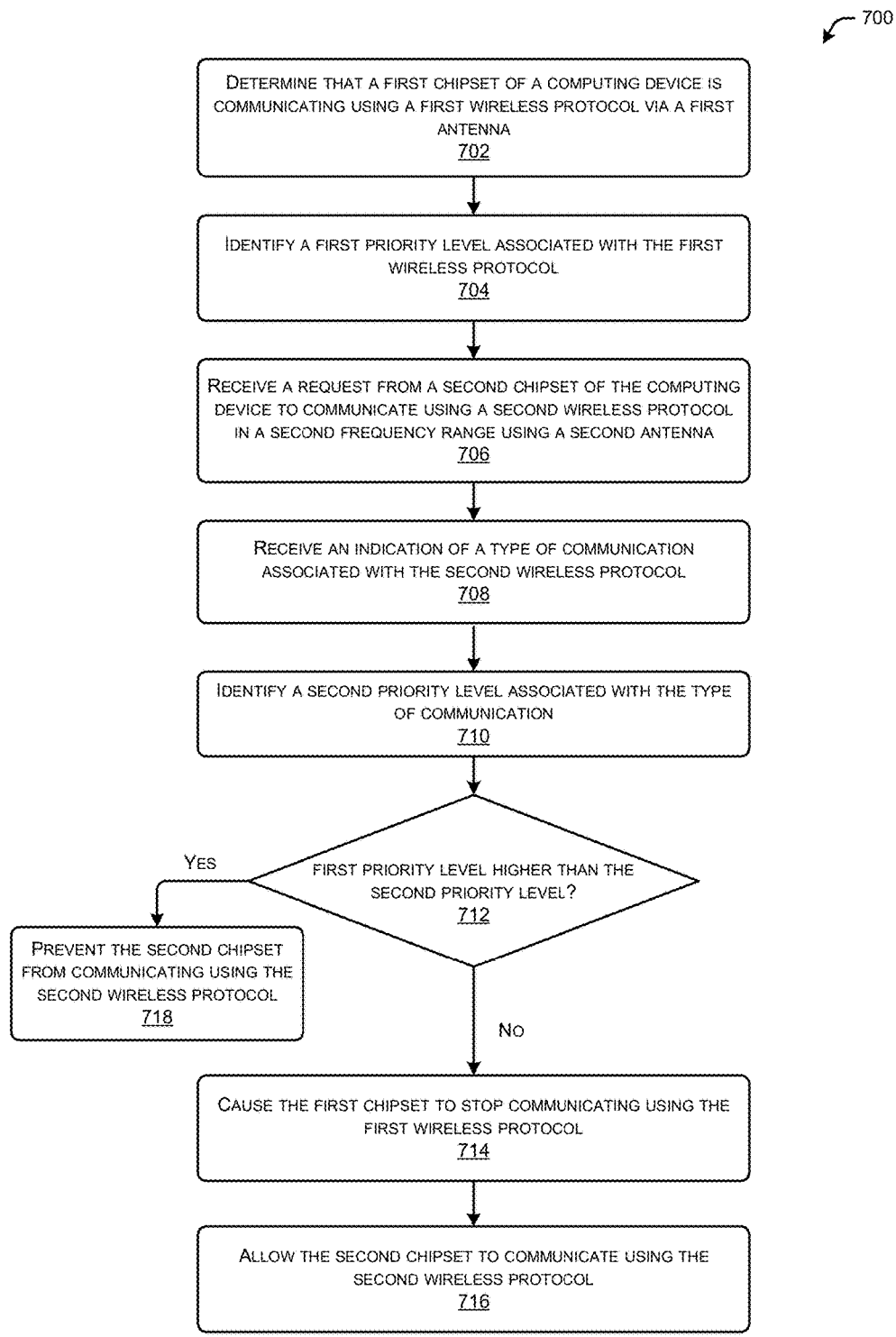
FIG. 7 is a flow diagram of an example process for determining that a first chipset is communicating using a first wireless protocol, receiving, at the first chipset, a request from a second chipset to communicate using a second wireless protocol, and determining whether to allow the second chipset to communicate based on priority levels of the first wireless protocol and second wireless protocol.

FIG. 7 is a flow diagram of an example process 700 for determining that a first chipset is communicating using a first wireless protocol, receiving, at the first chipset, a request from a second chipset to communicate using a second wireless protocol, and determining whether to allow the second chipset to communicate based on priority levels of the first wireless protocol and second wireless protocol.

At 702, the first chipset may determine that a first chipset of a computing device is communicating using a first wireless protocol via a first antenna, wherein the first chipset is configured to communicate signals in a first frequency range. At 704, the first chipset may identify, based on a default priority listing stored on the first chipset, a first priority level associated with the first wireless protocol.

At 706, the first chipset may receive, at the first chipset and from a second chipset of the computing device, a request to communicate using a second wireless protocol in a second frequency range using a second antenna, wherein the first frequency range and the second frequency range at least partially overlap. In some examples, receiving the request to communicate using the second wireless protocol comprises detecting a first logic high signal on a first conductor of an interface electrically connecting the first chipset and the second chipset.

At 708, the first chipset may receive, at the first chipset and from the second chipset, an indication of a type of communication associated with the second wireless protocol. The receiving the indication of the type of communication may comprise at least one of detecting a second logic high signal on a second conductor of the interface, or detecting a logic low signal on the second conductor of the interface. The second logic high signal may indicate that the type of communication is receiving data, and the logic low signal may indicate that the type of communication is transmitting data.

At 710, the first chipset may identify, based at least in part on the priority listing, a second priority level associated with the type of communication.

At 712, the first chipset may determine that the second priority level is higher than the first priority level based at least in part on the default priority listing. For example, the first chipset may analyze the default priority listing to determine that the second priority level is higher than the first priority level. At 714, the first chipset may cause the first chipset to stop communicating using the first wireless protocol. At 716, the first chipset may allow the second chipset to communicate using the second wireless protocol. In some instances, allowing the second chipset to communicate comprises placing a third logic high signal on a third conductor of the conductor interface.

In various examples, at 710 the first chipset may determine that the first priority level is higher than the second priority level. Based on determining that the first priority level is higher than the second priority level, at 718 the first chipset may determine to prevent the second chipset from communicating using the second wireless protocol. For instance, the first chipset may place a logic low signal on a third conductor of the conductor interface.

Figure 8:
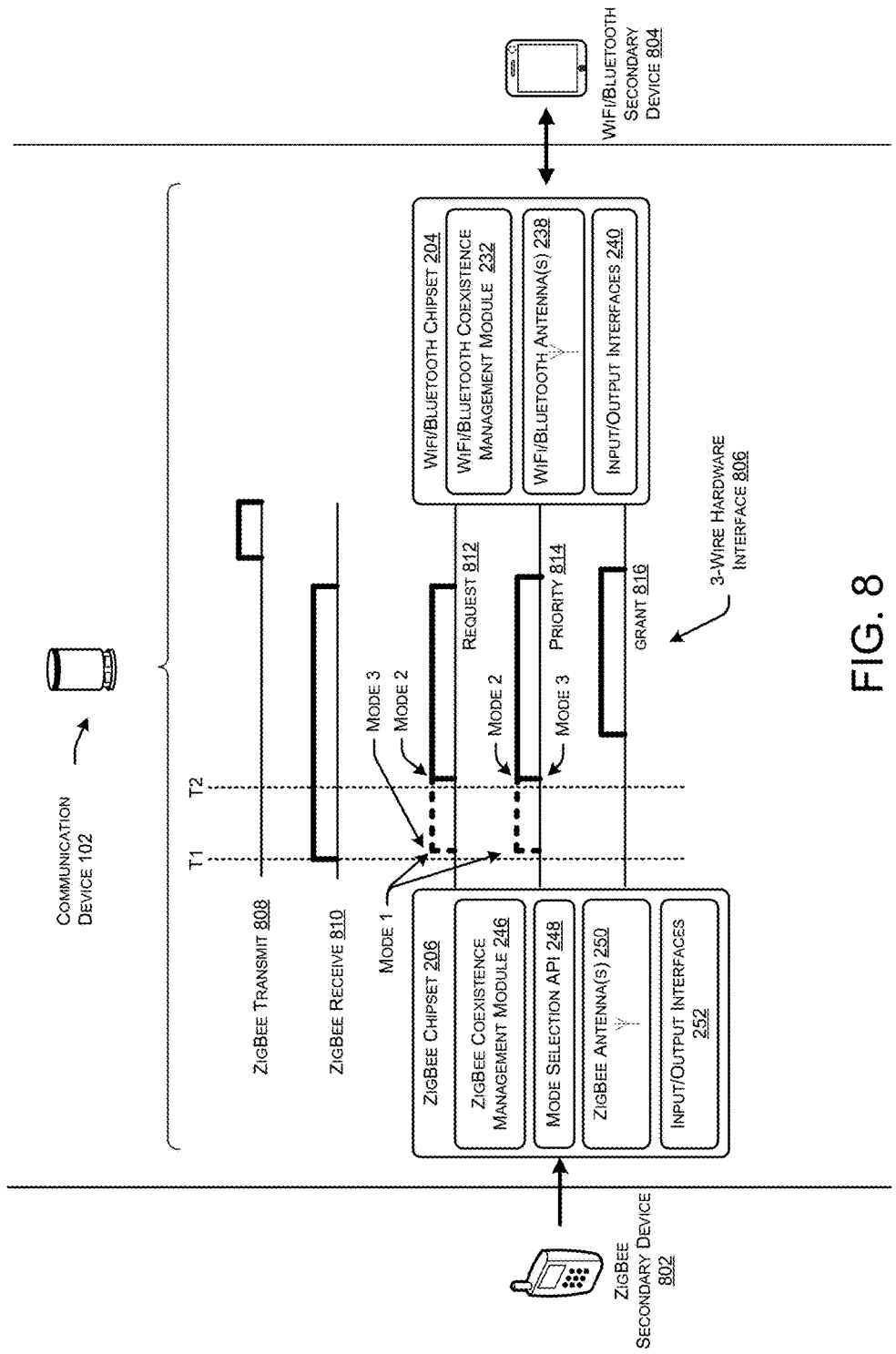
FIG. 8 illustrates example components of the communication device of FIG. 2 implementing timing rules by a ZigBee® chipset for sending a request and priority level to a WiFi/BT chipset.

FIG. 8 illustrates example components of the communication device of FIG. 2 implementing timing rules by a ZigBee® chipset for sending a request and an indication of a communication protocol to a WiFi/BT chipset.

In the example illustrated in FIG. 8, the ZigBee® chipset 206 may detect or receive by the ZigBee® antenna(s) 250 one or more packets from a ZigBee® secondary device 802, such as a remote control device. For instance, the ZigBee® chipset 206 may detect, by the ZigBee® antenna(s) 250, a preamble of a packet sent from the ZigBee® secondary device 802. As shown in FIG. 8, ZigBee® transmit 808 indicates whether the ZigBee® chipset 206 is transmitting data, and ZigBee® receive 810 indicates whether the ZigBee® chipset 206 is receiving data. As shown, at a time T1 the ZigBee® receive 810 indicates that the ZigBee® chipset 206 has detected the preamble of a packet sent from the ZigBee® secondary device 802.

In some examples, the ZigBee® chipset 206 may include a mode selection API 248 to select between various modes that indicate rules for sending a request. The mode selection API 248 may select between mode 1, mode 2, and mode 3. As illustrated in FIG. 8, if the mode selection API 248 has selected mode 1, the ZigBee® chipset 206 may place a logic high signal on a request wire 812 of a 3-wire hardware interface 806 connecting the ZigBee® chipset 206 and the WiFi/BT chipset 204 in response to detecting the preamble of the packet at time T1. Additionally, as shown, in Mode 1 a logic high signal may also be placed on a priority wire 814 of the 3-wire hardware interface 806 in response to detecting the preamble of the packet at T1. This logic high signal on the priority wire 814 may indicate that the ZigBee® chipset would like to receive data, which is a high priority type of communication, whereas transmitting data is a low priority type of communication indicated by a logic low signals. In some examples, mode 1 may represent the default mode selected by the mode selection API 248 when the ZigBee® chipset 206 and the WiFi/BT chipset 204 are working harmoniously and no loss in data or corrupt data problems are experienced.

In some instances, there may be devices in an environment of the communication device 102 which may be communicating using the ZigBee® standard and the packet may not actually be intended for the communication device 102. If the ZigBee® coexistence management module 246 were to place a high logic signal on the priority wire 814 of the 3-wire hardware interface 806 in anticipation of receiving data, that may cause communications being performed between the WiFi/BT chipset 204 and a WiFi/BT secondary device 804 to be stopped to allowed for a higher priority level ZigBee® communication. Accordingly, to avoid unnecessary interfering with any potential communications being performed by the WiFi/BT chipset 204, the ZigBee® coexistence management module 246 may refrain from placing a high logic signal on the priority wire 814 in response to detecting the preamble at time T1.

In some examples, the mode selection API 248 may select mode 2. For instance, if the WiF/BT chipset 204 is continually being interrupted due a high amount of ZigBee® traffic that is not indented for the communication device 102, the mode selection API 248 may select mode 2. In mode 2, the ZigBee® coexistence management module 246 may first analyze or decode the packet at time T2 to identify a destination address of the packet. After determining that the packet's destination address corresponds to an address of the communication device 102 at time T2, the ZigBee® coexistence management module 246 may place a logic high signal on the request wire 812 to indicate a request to communicate data to the WiFi/BT chipset 204. Additionally, the ZigBee® chipset 206 may place a logic high signal on the priority wire 814 to indicate that the ZigBee® chipset 206 is requesting to receive data from a secondary device. In this way, communications being performed by the WiFi/BT chipset 204 are only interrupted if the destination address in a received packet corresponds to the communication device 102.

In other examples, the mode selection API 248 may select mode 3. As shown in FIG. 3, when in mode 3 the ZigBee® chipset 206 may place a logic high signal on the request wire 812 in response to detecting the preamble of a packet at T1. However, rather than also placing a logic high signal on the priority wire 814 in response to detecting the preamble at T1, the ZigBee® chipset 204 may wait until time T2. At time T2, the packet is decoded or analyzed to determine whether a destination address corresponds to an address of the communication device 102. In response to determining that the destination address of the packet corresponds to the address of the communication device 102, the ZigBee® chipset 206 may place a logic high signal on the priority 814 wire. Similar to mode 2, mode 3 may prevent unnecessary interruption of communications performed by the WiFi/BT chipset 204 in instances where a packet being communicated by the ZigBee® standard is not intended for the communication device 102.

In various examples, the WiFi/BT coexistence management module 232 may place a logic high signal on a grant wire 816 of the three-wire hardware interface 806 which may allow the ZigBee® chipset 206 to receive the data from the ZigBee® secondary device 802.

Figure 9:
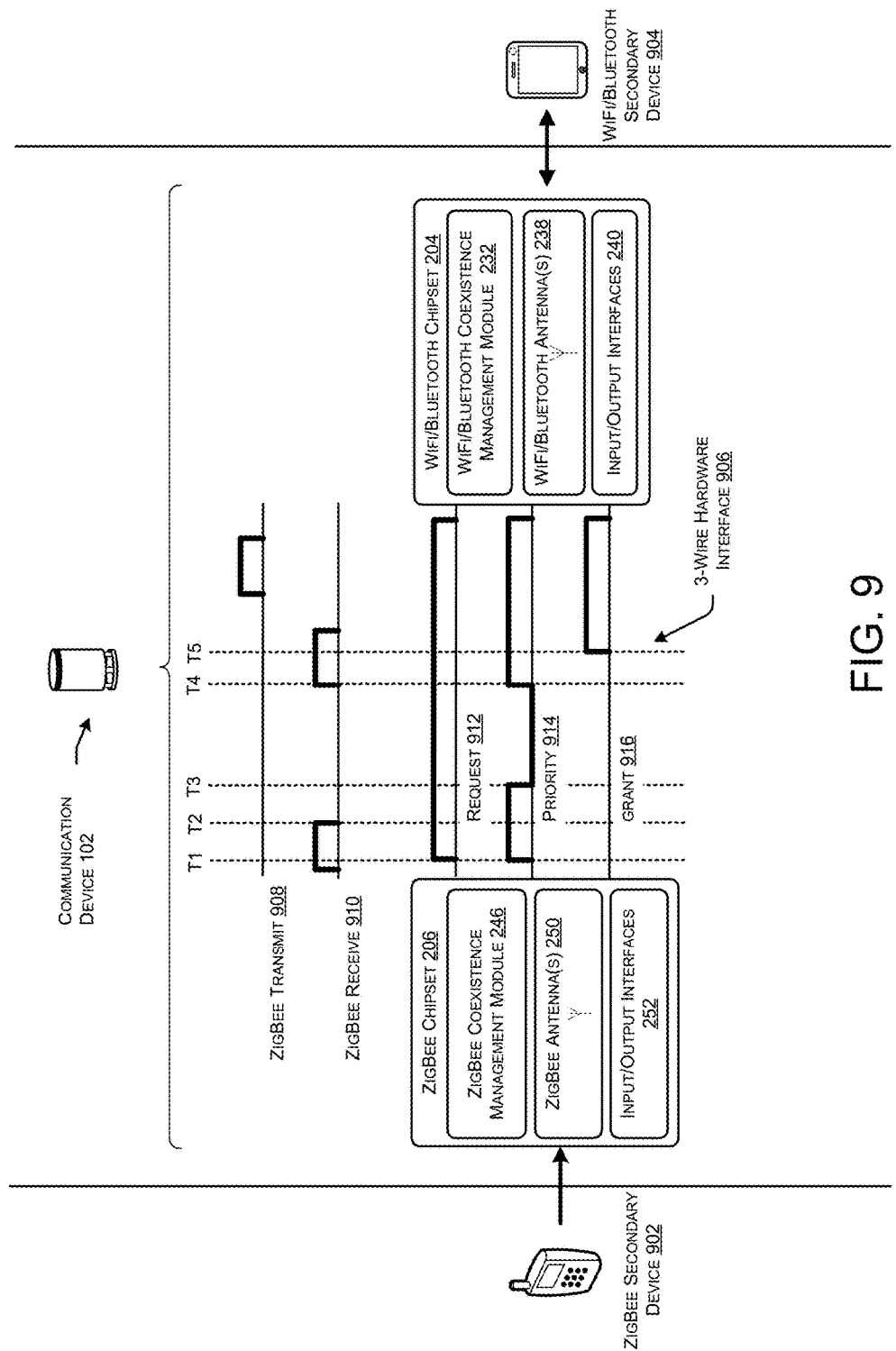
FIG. 9 illustrates example components of the communication device of FIG. 2 for performing next packet protection techniques when receiving data at a ZigBee® chipset from a secondary device.

FIG. 9 illustrates example components of the communication device of FIG. 2 for performing next packet protection techniques when receiving data at a ZigBee® chipset from a secondary device.

Similar to the example of FIG. 8, the ZigBee® chipset 206 may detect or receive by the ZigBee® antenna(s) 250 one or more packets from a ZigBee® secondary device 902, such as a remote control. For instance, the ZigBee® chipset 206 may detect, by the ZigBee® antenna(s) 250, a preamble of a packet sent from the ZigBee® secondary device 902. As shown in FIG. 9, ZigBee® transmit 908 indicates whether the ZigBee® chipset 206 is transmitting data, and ZigBee® receive 910 indicates whether the ZigBee® chipset 206 is receiving data. As shown, at a time T1 the ZigBee® receive 910 indicates that the ZigBee® chipset 206 has detected the preamble of a packet sent from the ZigBee® secondary device 902 and that the packet has been analyzed and/or decoded to determine that a destination address of the packet corresponds to the communication device 102.

Based at least in part on determining that the destination address in the packet sent from the ZigBee® secondary device 902 corresponds to the address of the communication device 102 at time T1, the ZigBee® coexistence management module 246 may place logic high signals on the request wire 912 and on the priority wire 914 of a three-wire hardware interface 906 at time T1 indicating a request to receive data. At time T2, the ZigBee® coexistence management module 246 may determine that the ZigBee® chipset 206 has finished receiving the packets sent from the ZigBee® secondary device 902. However, the ZigBee® coexistence management module 246 may further determine that either portions of a packet were not received, or portions of a packet were corrupted during receipt. In some instances, this may be caused due to the WiFi/BT chipset 204 not stopping communication with the WiFi/BT secondary device 904 fast enough after detecting the logic high signal on the request wire 912 and logic high signal on priority wire 914 and having overlapping communications occurring during reception of the packet from the ZigBee® secondary device 902.

Generally, in response to successfully receiving data from a ZigBee® secondary device 902, the ZigBee® chipset 206 would send an acknowledgement packet to the ZigBee® secondary device 902 so the device knows the ZigBee® chipset 206 received the data. However, if portions of a packet were not received or were corrupted, as determined at time T2, the ZigBee® chipset 206 may not send an acknowledgement packet. In such instances, the ZigBee® coexistence management module 246 may expect the ZigBee® secondary device 902 to attempt to resend the packet, and thus, at time T3 the ZigBee® coexistence management module 246 may determine to maintain the logic high signal on request wire 912, but the ZigBee® coexistence management module 246 may determine to place a logic low signal on the priority wire 914. In this way, the WiFi/BT chipset 204 may finish communicating while the ZigBee® chipset 206 waits for another packet. At time T4, the ZigBee® chipset 206 may detect another packet. However, rather than waiting to analyze and decode the received packet to determine a destination address, the ZigBee® coexistence management module 246 may place a logic high signal on the priority wire 914 after detecting the packet, such as the preamble. In this way, logic high signals are placed on the request wire 912 and priority wire 914 immediately after detecting the preamble of the packet, which provides the WiFi/BT chipset 204 more time to stop performing any lower level communications than if the destination address must be determined before placing a logic high signal on the priority wire 914. At time T5, the WiFi/BT coexistence management module 232 may place a logic high signal on a grant wire 916 of the three-wire hardware interface 906 to allow the ZigBee® chipset 206 to receive the packet and transmit an acknowledgement packet to the ZigBee® secondary device 902. Thus, the techniques described in FIG. 9 may provide additional time and protection for packets that are expected to be received from a ZigBee® secondary device 902 due to portions of a previously obtained packet being corrupt or lost.

Figure 10:
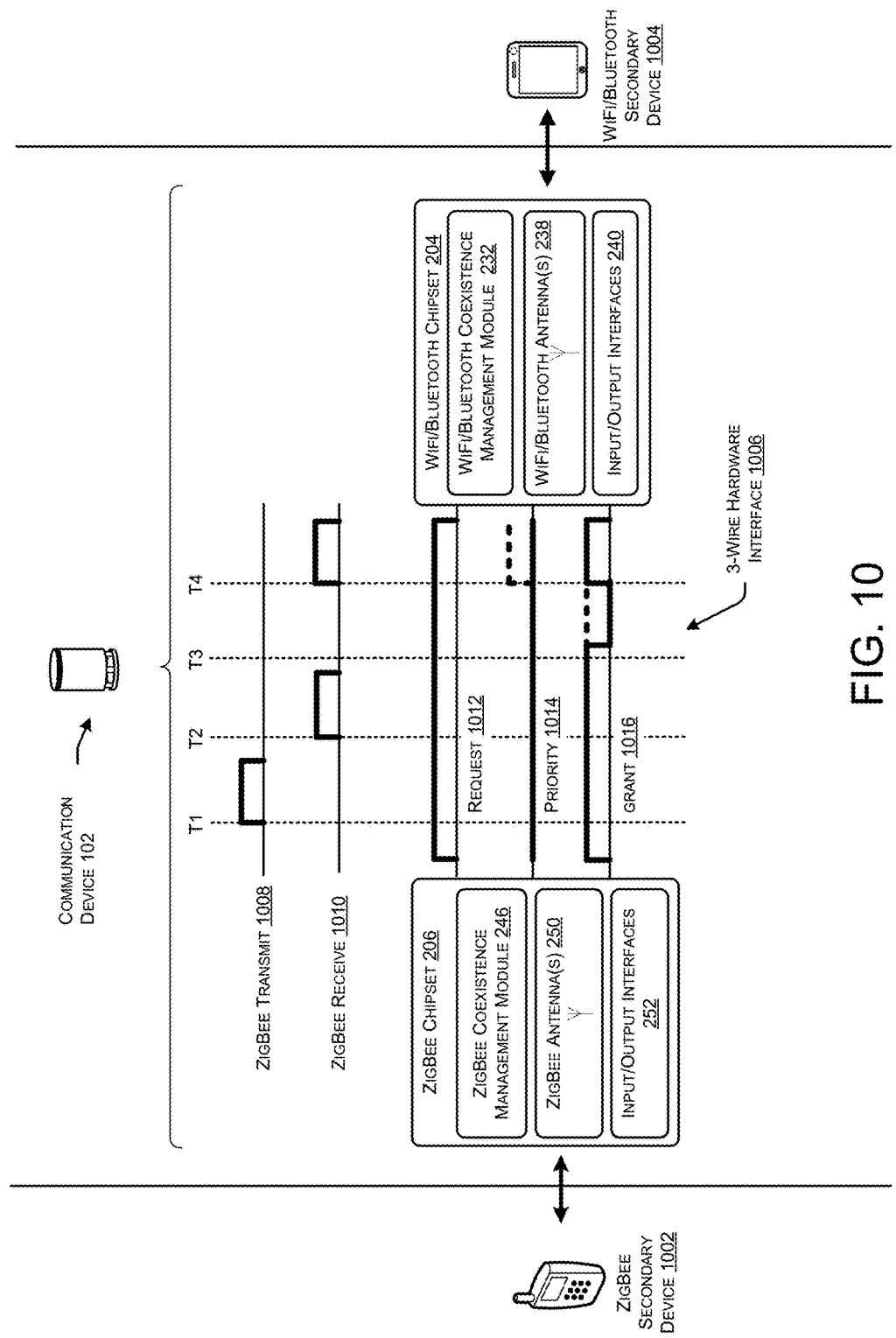
FIG. 10 illustrates example components of the communication device of FIG. 2 for performing next packet protection techniques when transmitting data from a ZigBee® chipset to a secondary device.

FIG. 10 illustrates example components of the communication device of FIG. 2 for performing next packet protection techniques when transmitting data from a ZigBee® chipset to a secondary device.

In some examples, the ZigBee® chipset 206 may determine to transmit data to a ZigBee® secondary device 1002. For example, the ZigBee® chipset 206 receive a command to transmit data packets to a ZigBee® secondary device 1002. For example, a user 108 may issue a voice command to the communication device 1002 to cause ZigBee® chipset 206 to send data to the ZigBee® secondary device 1002 to perform an operation. In response to determining to transmit data to the ZigBee® secondary device 1002, the ZigBee® coexistence management module 246 may place a logic high signal on request wire 1012 of a three-wire hardware interface 1006 and place a logic low signal on a priority wire 1014 indicating the request is to transmit data (i.e., lower priority type of communication). The WiFi/BT coexistence management module 232 may determine to grant the request and place a logic high signal on a grant wire 1016. At time T1, the ZigBee® coexistence management module 246 may detect the logic high signal on the grant wire 1016 and cause the ZigBee® chipset 206 to transmit the data to the ZigBee® secondary device 1002, as shown in the ZigBee® transmit 1008 indication.

Generally, after transmitting data, the ZigBee® chipset 206 receives an acknowledgement packet from the ZigBee® secondary device 1002, such as a MAC layer acknowledgement packet, that the ZigBee® secondary device 1002 has received the data. Thus, the ZigBee® coexistence management module 246 may maintain the logic high signal on the request wire 1012 until a MAC layer acknowledgement packet is received from the ZigBee® secondary device 1002. However, depending on the type of the ZigBee® secondary device 1002, the ZigBee® chipset 206 may also receive an application layer acknowledgement packet. In various examples, the ZigBee® coexistence management module 246 may determine a device type of the ZigBee® secondary device 1002. For instance, the ZigBee® coexistence management module 246 may store indications of device types associated with the communication device 102 which send application layer acknowledgement packets. If the device type is associated with a type of device which sends an application layer acknowledgment packet, the ZigBee® coexistence management module 246 may maintain the logic high signal on the request wire 1002, and maintain the logic low signal on the priority wire 1014 at time T3. In this way, the WiFi/BT chipset 204 may communicate which the ZigBee® chipset 206 waits for the application layer acknowledgement packet. In some examples, the WiFi/BT coexistence management module 232 may determine to place a logic low signal on the grant wire 1016 to communicate using WiFi/BT communication types, or alternatively maintain the logic high signal on the grant wire 1016 if the WiFi/BT chipset 204 is not communicating.

At time T4, the ZigBee® chipset 206 may detect the application layer acknowledgement packet, as shown by ZigBee® receive 1010. In some examples, the ZigBee® chipset 206 may place a logic high signal on the priority wire 1014 which indicates the request is to receive data. The WiFi/BT coexistence management module 232 may place a logic high signal on the grant wire 1016 to allow the ZigBee® chipset 206 to receive the application layer acknowledgement packet.

In this way, the ZigBee® coexistence management module 246 may protect expected application layer acknowledgement packets based on a determination of a device type of the ZigBee® secondary device 1002. In some examples, this may increase the performance of the ZigBee® chipset by ensuring that the application layer acknowledgement packet is not lost or corrupted due to a communication performed simultaneously by the WiFi/BT chipset 204.

Figure 11:
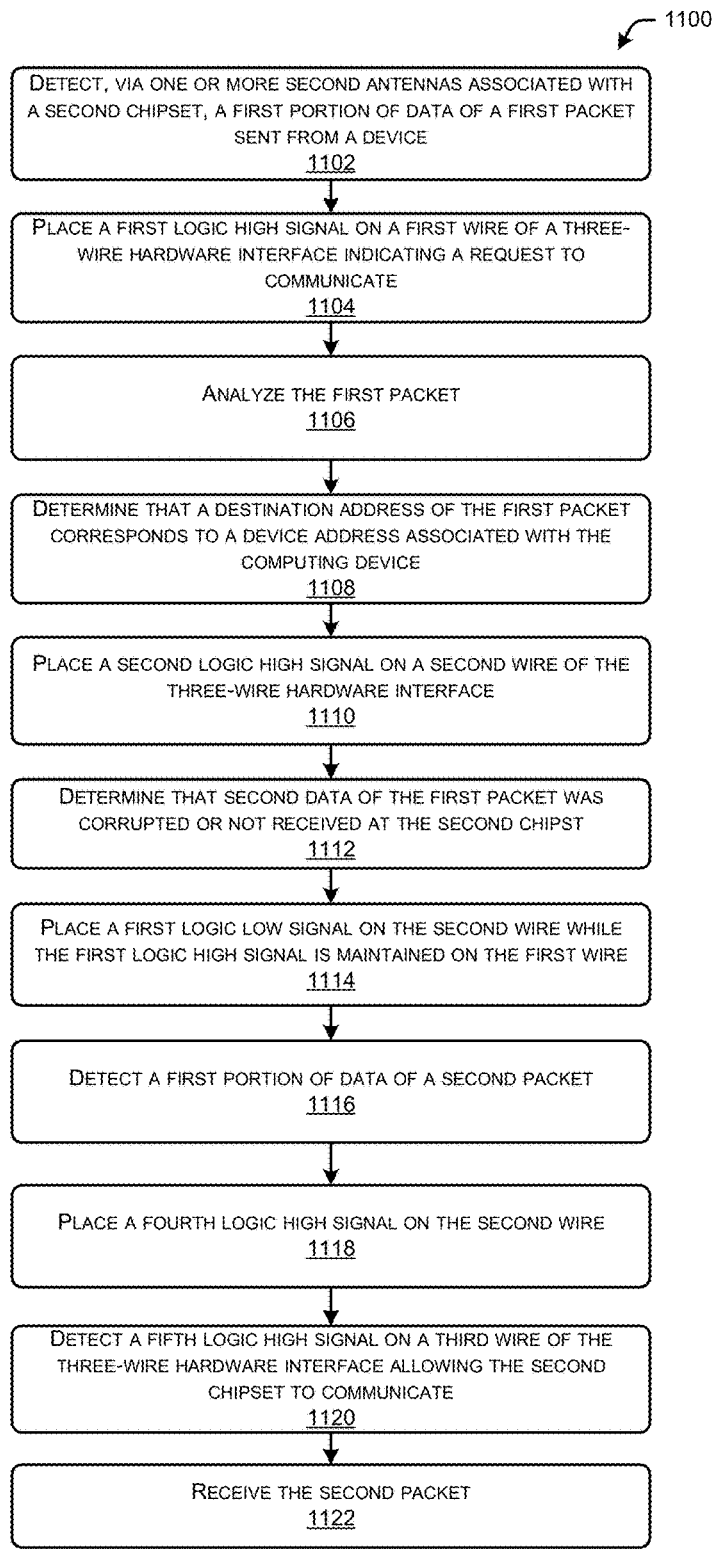
FIG. 11 is a flow diagram of an example process for implementing timing rules by a second chipset for sending a request and a priority level to a first chipset.

FIG. 11 is a flow diagram of an example process 1100 for implementing timing rules by a second chipset for sending a request and a priority level to a first chipset.

At 1102, the second chipset may detect a first portion of data of a first packet sent from a device to a computing device including a second chipset and a first chipset. The one or more second antennas may be associated with the second chipset and communicate signals in a second frequency range. In some examples, the first packet may be sent using and conform to the IEEE 802.15.4 standard, such as ZigBee®.

At 1104, the second chipset may place a first logic high signal on a first wire of the three-wire hardware interface. The first logic high signal may indicate a request to communicate data. At 1106, the second chipset may analyze the first the first portion of data of the first packet, where the analyzing may include decoding the first portion of data to identify a destination address. For example, the second chipset may decode a header of the first packet to determine the destination address of the first packet. At 1108, the second chipset may determine that a destination address of the first packet corresponds to a device address associated with the computing device. At 1110, the second chipset may place a second logic high signal on a second wire of the three-wire hardware interface to indicate the request to communicate data is associated with receiving data. In some examples, the second chipset may detect, via a third wire of the three-wire hardware interface, a third logic high signal allowing the second chipset to communicate, and the second chipset may receive the first packet.

In some examples, at 1112 the second chipset may further determine that a second portion of the data of the first packet was corrupted or not received at the second chipset. At 1114, the second chipset may place a first logic low signal on the second wire while the first logic high signal is maintained on the first wire. At 1116, the second chipset may detect a first portion of data of a second packet. The second packet may be sent using the IEEE 802.15.4 standard. At 1118, the second chipset may place a fourth logic high signal on the second wire of the three-wire hardware interface based at least in part on detecting the first portion of data of the second packet. At 1120, the second chipset may detect a fifth logic high signal on a third wire of the three-wire hardware interface allowing the second chipset to communicate data via the one or more second antennas. At 1122, the second chipset may receive, via the one or more second antennas, the second packet.

Figure 12:
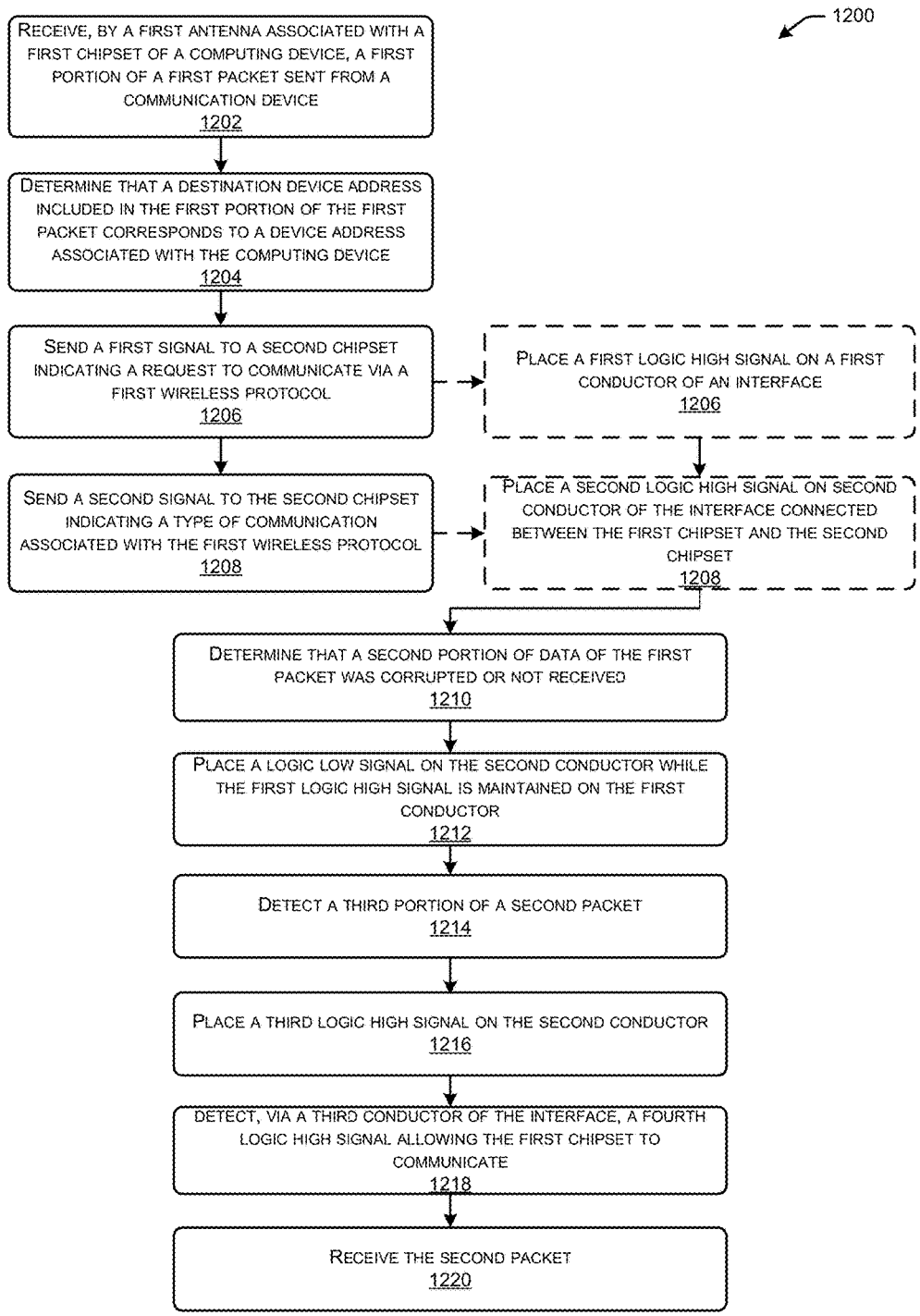
FIG. 12 is a flow diagram of an example process for performing next packet protection techniques when receiving data at a ZigBee® chipset from a secondary device.

FIG. 12 is a flow diagram of an example process 1200 for performing next packet protection techniques when receiving data at a ZigBee® chipset from a secondary device.

At 1202, a first chipset of a computing device may receive, by a first antenna associated with the first chipset, a first portion of a first packet sent from a communication device, wherein the first chipset is configured to communicate signals in a first frequency range using the first antenna. At 1204, the first chipset may determine that a destination device address included in the first portion corresponds to a device address associated with the computing device. For instance, the first chipset may analyze or otherwise decode a portion of the first packet, such as the header, and determine the destination address. The first chipset may then compare the destination address to a destination address associated with the computing device.

At 1206, the first chipset may send a first signal to a second chipset indicating a request to communicate via a first wireless protocol based at least in part on determining that the destination address corresponds to the device address associated with the computing device. At 1208, the first chipset may send a second signal to the second chipset indicating a type of communication associated with the first wireless protocol. In some examples, the type of communication may be receiving data, and in other examples the type of communication may be transmitting data using the first wireless protocol.

In some examples, at 1206, the sending the first signal to the second chipset indicating the request to communicate may comprise sending, via a first conductor of an interface connecting the first chipset and the second chipset, a request signal. Further, at 1208, the sending the second signal to the second chipset indicating the priority level may comprise placing a second logic high signal on a second conductor of the interface. The second logic high signal may indicate high priority level associated with the first type of communication, such as a request to receive data.

In such examples, at 1210, the first chipset may determine that a second portion of data of the first packet was corrupted or not received. At 1212, the first chipset may place a logic low signal on the second conductor while the first logic high signal is maintained on the first wire. At 1214, the first chipset may detect, by the first antenna, a third portion of a second packet. At 1216, the first chipset may place a third logic high signal on the second conductor, which indicates a high priority level, based at least in part on detecting the third portion of the second packet. At 1218, the first chipset may detect, via a third conductor of the interface, a fourth logic high signal allowing the first chipset to communicate data via the first antenna. At 1220, the first chipset may receive, the second packet.

Figure 13:
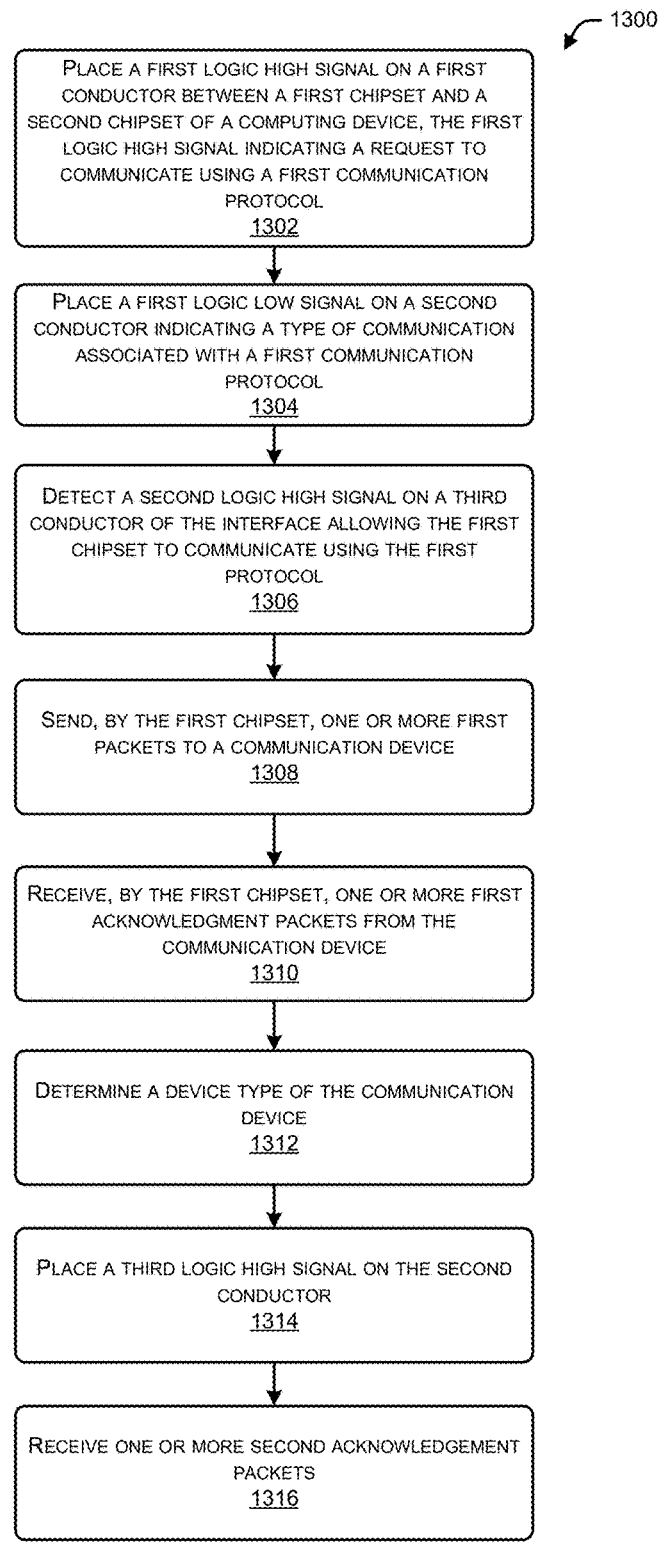
FIG. 13 is a flow diagram of an example process for performing next packet protection techniques when transmitting data from a ZigBee® chipset to a secondary device.

FIG. 13 is a flow diagram of an example process 1300 for performing next packet protection techniques when transmitting data from a ZigBee® chipset to a secondary device.

At 1302, the a first chipset of a computing device may place a first logic high signal on a first conductor of an interface of the computing device, wherein the first logic high signal indicates a request to communicate using a first communication protocol. In some instances, the interface may connect a first chipset and a second chipset of the computing device, where the first chipset uses a first antenna to communicate signals in a first frequency range. At 1304, the first chipset may place a first logic low signal on a second conductor of the interface, where the second logic low signal indicates a low priority level associated with the first communication protocol. For instance, the first logic low signal may indicate that the first chipset would like to transmit data to a communication device.

At 1306, the first chipset may detect a second logic high signal on a third conductor of the interface allowing the first chipset to communicate using the first communication protocol. In various examples, the second chipset communicates using a second antenna that communicate signals in a second frequency range that at least partially overlaps with the first frequency range.

At 1308, the first chipset may send, using the first antenna, one or more first packets to a communication device. At 1310, the first chipset may receive, by the first antenna, one or more first acknowledgement packets from the communication device. In some examples, the one or more first acknowledge packets may be media access control layer acknowledgement packets. At 1312, the first chipset may determine a device type of the communication device. For instance, the first chipset may query a database stored on the computing device which associates device types with address of the communication or secondary devices. The first chipset may determine that the communication device is associated with an application layer as well, and that the communication device will send application layer acknowledgement packets as well.

At 1314, the first chipset may place a third logic high signal on the second wire, where the third logic high signal indicates a high priority level. In this way, because the communication device is a device type which sends application layer acknowledgement packets, the first chipset may indicate a high priority in anticipation of receiving the application layer acknowledgement packets. This may protect or ensure safe receipt by the first chipset of the application layer acknowledgment packets.

At 1316, the first chipset may receive one or more second acknowledgement packets at the first chipset and from the communication device. The one or more second acknowledgment packets may be application layer acknowledgment packets.

Figure 14:
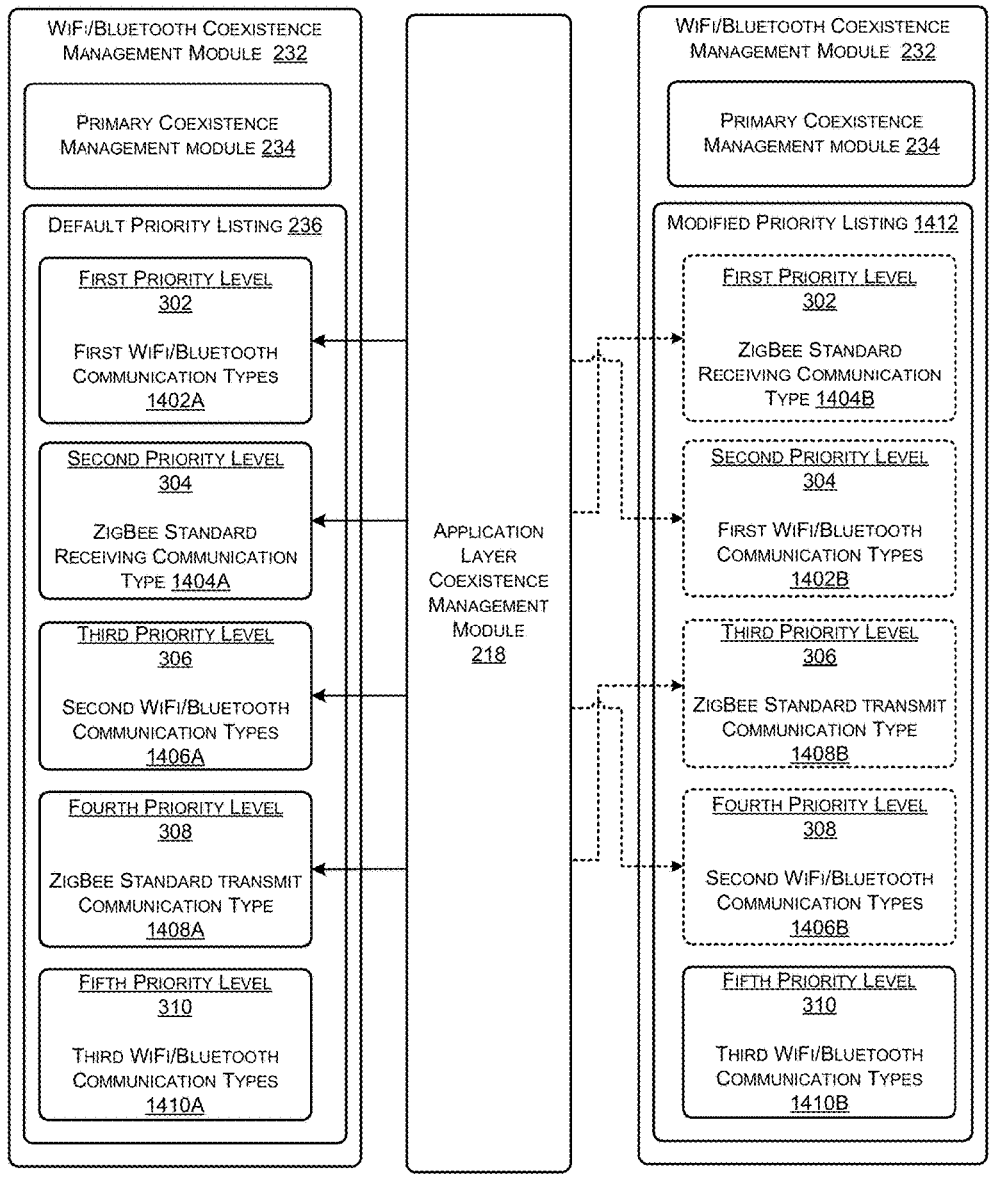
FIG. 14 illustrates example components of the communication device of FIG. 2 for modifying a default priority listing by an application layer coexistence management module.

FIG. 14 illustrates example components of the communication device of FIG. 2 for modifying a default priority listing by an application layer coexistence management module.

As described in FIG. 2, the WiFi/BT coexistence management module 232 may be encoded and/or stored on the WiFi/BT chipset 204 as hardware and/or firmware and is generally "low level" intelligence. The WiFi/BT coexistence management module 232 may perform communication arbitration using a rigid application of the default priority listing 236 without considering other data or events occurring in and around the communication device 102.

In some examples, an application layer coexistence management module 218 may be stored in the computer-readable media 212 of the central processing unit 202 of the communication device 102. This application layer coexistence management module 218 may generally comprise computer-readable instructions (e.g., software) executable by the processor(s) 210. The application layer coexistence management module 218 may generally comprise "high level" intelligence which may modify, at least temporarily, the default priority listing 236 to account for other data or events occurring in and around the communication device 102, to create the modified priority listing 1412.

In some examples, the application layer coexistence management module 218 may monitor an amount of data stored in an audio buffer of the computing device 102 and modify the default priority listing 236 based on the amount of data in the audio buffer. For example, the application layer coexistence management module 218 may monitor an amount of data stored in a WiFi audio buffer of the computing device 102 and modify the default priority listing if more than a threshold, or less than a threshold, amount of data is identified. As described in FIG. 2, the fifth priority level 310 may include a WiFi communication type for when the WiFi/BT chipset 204 is in a connected state and is receiving data, such as audio data, using a WiFi communication protocol. Due to the relatively low priority, other types of higher level communications being performed may cause the WiFi buffer to have less than a threshold amount of data stored, which could result in poor performance when outputting audio using the stored data in the WiFi buffer. For example, the ZigBee® chipset 204 may be receiving and/or transmitting a lot of data, both of which have higher default priority levels than the WiFi communication type. However, to avoid poor audio performance, the application layer coexistence management module 218 may adjust the priority level of the WiFi connected state from lowest priority to a higher priority level than the other types of communication occurring, such as ZigBee® transmit 1408A and/or ZigBee® receive 1404A. After a period of time, such as when the WiFi buffer has stored up with a sufficient amount of data, the priority levels may be returned to the default levels.

In some examples, the application layer coexistence management module 218 may monitor an amount of requests that have been sent from the ZigBee® chipset 206 to the WiFi/BT chipset 204 to communicate, and if the amount of requests are higher than a threshold (e.g., more than two), then the application layer coexistence management module 218 may elevate the priority of the ZigBee® communication, at least for a period of time. For example, the ZigBee® chipset 206 may send multiple requests to the WiFi/BT chipset 204 and send indications that the ZigBee® chipset 206 would like to transmit data, which is in the fourth priority level 308. However, the WiFi/BT chipset 204 may determine to not grant these requests because a higher level WiFi or Bluetooth® communication is being performed. In such instances, the application layer coexistence management module 218 may determine to elevate the priority of the ZigBee® transmit from fourth priority level 308 to a higher priority level, as shown in FIG. 14. In this way, the ZigBee® chipset 206 may be allowed to perform its transmit that it has repeatedly requested to perform. After the transmission has been performed, the application layer coexistence management module 218 may return the ZigBee® transmit to its default priority level. Thus, the application layer coexistence management module 218 may monitor an amount of requests, and in some examples an amount of grants, which have been sent and received between the ZigBee® chipset 206 and the WiFi/BT chipset 204. If the requests are over a threshold amount, and/or the grants are under a threshold amount, then the application layer coexistence management module 218 may modify the priority levels of one or more communication types.

In various examples, the application layer coexistence management module 218 may determine to change priorities of the default priority listing 236 based on the types of devices attempting to communicate with the communication device 102. The type of devices may indicate actual intent of a user, and may be elevated based on determining the intent of the user. For example, the communication device 102 may be streaming audio data using the A2DP Bluetooth® profile, which may be included in the third priority level 306 comprising the second WiFi/BT communication types 1406A. While communicating, the ZigBee® chipset 206 may receive data which comprises a request from a user device (e.g., a key fob associated with a user) to unlock a door handle or open a garage door. Using the default priority listing 236, the WiFi/BT coexistence management module 232 may normally determine to not grant the ZigBee® chipset 206 request to transmit the command to the garage door or the door handle as the ZigBee® standard transmit communication type 1408A is in the default fourth priority level 308. However, the application layer coexistence management module 218 may determine that the type of device that the transmit of data is to be sent to is the garage door opener or the door handle, and change the default priority listing 236 to a modified priority listing 1412. In some examples, the application layer coexistence management module 218 may store indications of what types of devices may be associated with user intent, such as lights (e.g., a voice command from a user to turn on a light), a television (e.g., a voice command to turn on the television), an oven (e.g., a command to preheat the oven), etc. Based on the device types stored, the application layer coexistence management module 218 may elevate priority levels. As shown in FIG. 14, the application layer coexistence management module 218 may change the priorities in the default priority listing 236. For example, the application layer coexistence management module 218 may, at least temporarily, elevate the ZigBee® standard transmit communication type 1408B to the third priority level 306, and lower the second WiFi/BT communication types 1406B, which includes the A2DP Bluetooth® profile, to the fourth priority level 308. In this way, the change the priorities in the default priority listing 236. For example, the application layer coexistence management module 218 may, at least temporarily, elevate the ZigBee® standard transmit communication type 1408B to the third priority level 306, and lower the second WiFi/BT communication types 1406B, which includes the A2DP Bluetooth® profile, to the fourth priority level 308. May determine actual user intent, such as allowing a slight decrease in performance of streaming audio to turn on an appliance the user would like turned on, based on a type of device associated with the request from the ZigBee® chipset 206.

In some examples, the WiFi/BT coexistence management module 234 may additionally or alternatively perform various techniques for modifying the priority listing, similar to the techniques performed by the application layer coexistence management module 218. For example, the WiFi/BT chipset 204 may be receiving/streaming audio data from a music player (e.g., music player 104(2)) using an A2DP Bluetooth® profile which is grouped into the second WiFi/BT communication type 1406A, listed as the third priority level 306 in the default priority listing 236 of FIG. 14. In some examples, the WiFi/BT coexistence management module 234 may elevate or lower the priority level of the second WiFi/BT communication type 1406A based on the amount of audio data in an audio buffer associated with the WiFi/BT chipset 204. For instance, the WiFi/BT coexistence management module 234 may determine that less than a threshold amount of data is stored in the audio buffer associated with the WiFi/BT chipset 204 due to the ZigBee® chipset 206 performing the ZigBee® standard receiving communication type 1404A, which is listed as the second priority level 304. In this case, the WiFi/BT coexistence management module 234 may determine to elevate the second WiFi/BT communication types 1406A from the third priority level 306 to a priority level higher than the ZigBee® standard receiving communication type 1404A, at least for a period of time. The WiFi/BT coexistence management module 234 may then return the second WiFi/BT communication types 1406A to its default priority once the audio buffer of the WiFi/BT chipset 204 has received and stored sufficient audio data. In this way, the WiFi/BT coexistence management module 234 may determine to elevate a priority listing to allow the WiFi/BT chipset 204 to receive data based on a Bluetooth® audio buffer having less than a threshold amount of data due to a lot of ZigBee® communication being performed.

In some examples, the WiFi/BT coexistence management module 234 may determine that more than a threshold amount of data is in the audio buffer associated with the WiFi/BT chipset 204, and that the ZigBee® chipset 206 is unable to perform the ZigBee® standard transmit communication type 1408A which is grouped in the fourth priority level 308. In some instances, the WiFi/BT coexistence management module 234 may further determine more than a threshold amount of requests have been received from the ZigBee® chipset 206, and/or less than a threshold number of grants have been sent to the ZigBee® chipset to transmit data. Based on determining that the amount of audio data in the audio buffer is higher than the threshold amount of data, and in some examples, on the number of requests from the ZigBee® coexistence management module 246 to transmit data from the ZigBee® chipset 206, the WiFi/BT coexistence management module 234 may change the priorities in the default priority listing 236. For example, the WiFi/BT coexistence management module 234 may, at least temporarily, elevate the ZigBee® standard transmit communication type 1408B to the third priority level 306, and/or lower the second WiFi/BT communication types 1406B, which includes the A2DP Bluetooth® profile, to the fourth priority level 308. In this way, the WiFi/BT coexistence management module 234 may allow the ZigBee® chipset 206 to transmit data without affecting the performance of the communication device in outputting sound represented in the audio data because the audio buffer has enough audio data stored to allow for the ZigBee® chipset to transmit data.

Figure 15:
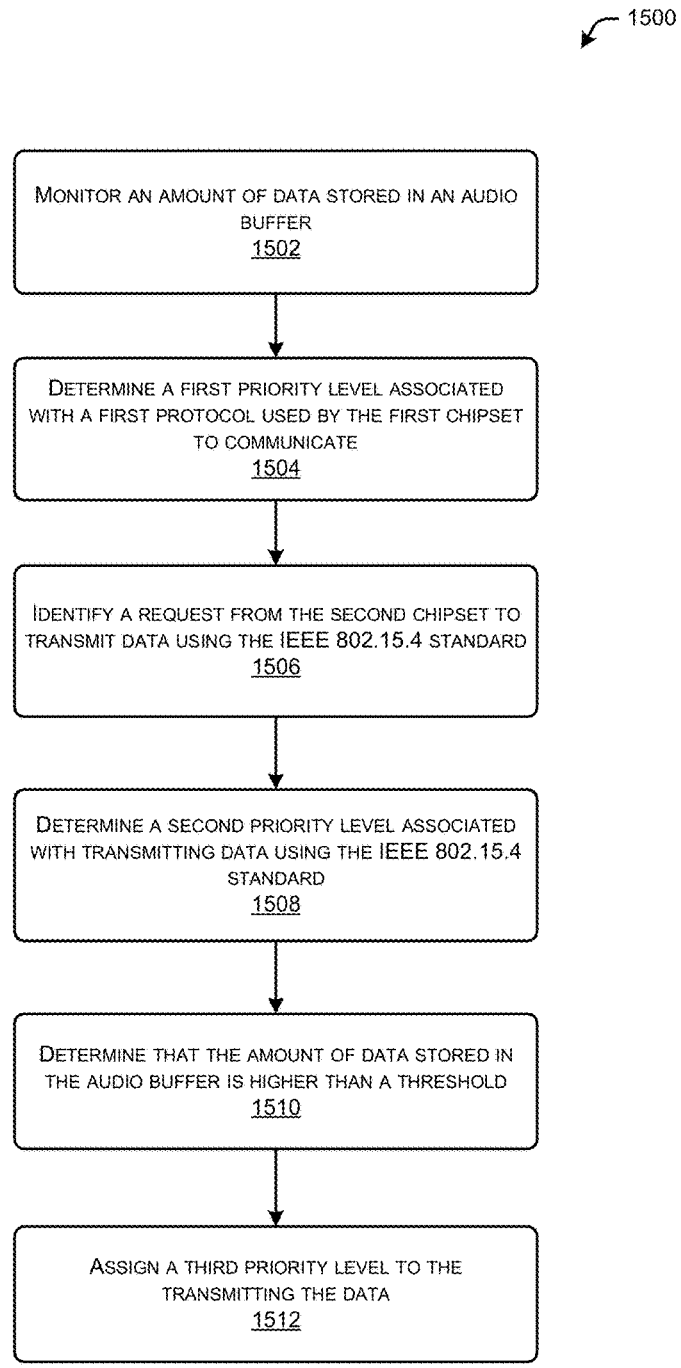
FIG. 15 is a flow diagram of an example process where an application layer coexistence management module may modify a priority level for transmitting data using a communication standard by a chipset of the communication device of FIG. 2.

FIG. 15 is a flow diagram of an example process 1500 where an application layer coexistence management module may modify a priority level for transmitting data using a communication standard by a chipset of the communication device 102 of FIG. 2 based on an amount of data stored in an audio buffer.

At 1502, the application layer coexistence management module may monitor an amount of data stored in an audio buffer of a system. In some examples, the data may be stored in an audio buffer associated with the WiFi communication standard. At 1504, the application layer coexistence management module may determine, based at least in part on a default priority listing, a first priority level associated with the first protocol. In some examples, the first protocol may be associated with the IEEE 802.11 standard and used for receiving, using the first antenna, signals representing the data stored in the audio buffer.

At 1506, the application layer coexistence management module may identify a request from the second chipset to transmit data using the IEEE 802.15.4 standard. For instance, the application layer coexistence management module may determine that the ZigBee® chipset 206 placed a logic high signal on a request wire, and placed a logic low signal on a priority wire, of a conductor interface.

At 1508, the application layer coexistence management module may determine, based on the default priority listing, a second priority level associated with transmitting data using the IEEE 802.15.4 standard. The second priority level for transmitting data may be lower than the first priority level for receiving signals representing the data using the IEEE 802.11 standard.

In some instances, at 1510 the application layer coexistence management module may determine that the amount of data stored in the audio buffer is higher than a threshold. This may indicate that audio being output by the communication device 102 may be supported by the data in the audio buffer for a sufficient period of time to allow other communications to be performed.

At 1512, the application layer coexistence management module may assign a third priority level to the transmitting the data using the IEEE 802.15.4 standard. The third priority may be higher than the second priority level. In various examples, the application layer coexistence management module may assign the third priority based at least in part on the amount of data stored in the audio being higher than the threshold. In this way, the second chipset may be allowed to transmit data for a period of time because the audio buffer has enough data stored to continue to output audio represented by the data without suffering from poor performance due to low data in the audio buffer.

Figure 16:
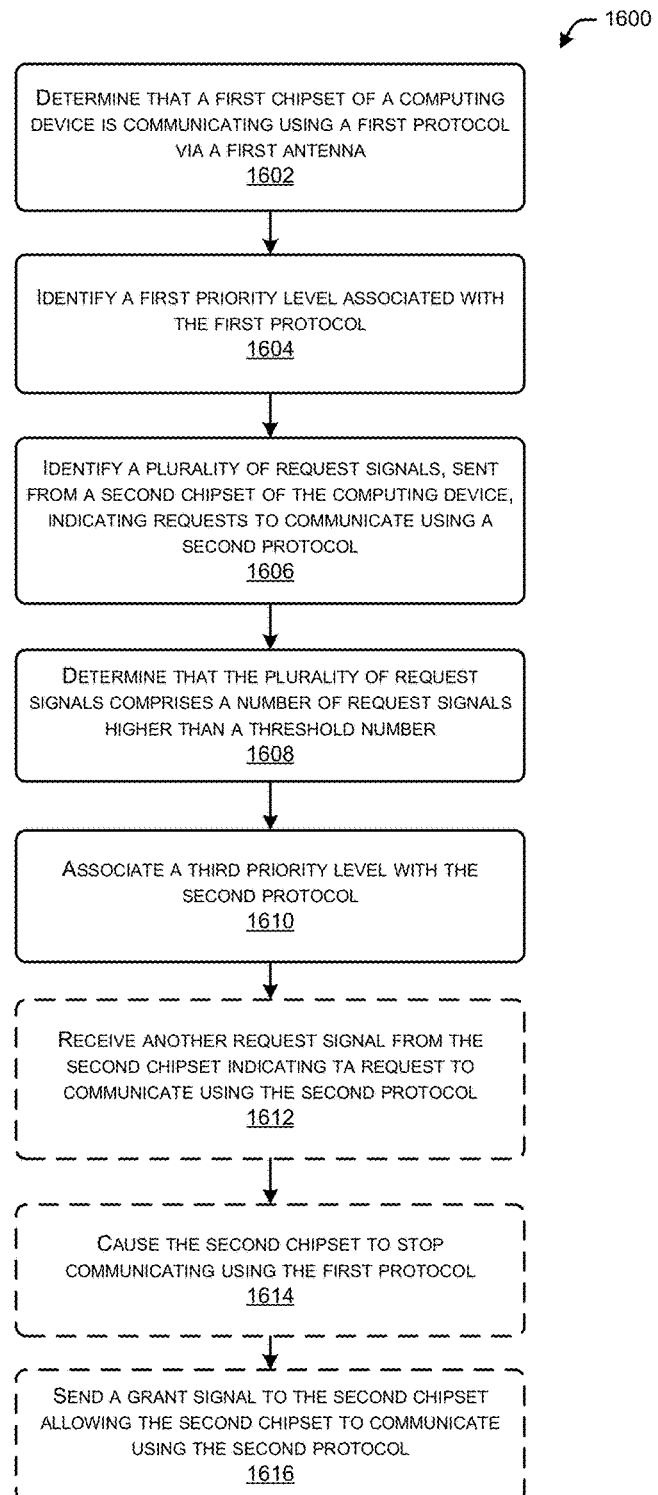
FIG. 16 is a flow diagram of an example process where an application layer coexistence management module modifies a priority level of a first protocol used to communicate by a chipset of the communication device of FIG. 2 based on detecting a number of request signals higher than a threshold number.

FIG. 16 is a flow diagram of an example process 1600 where an application layer coexistence management module modifies a priority level of a first protocol used to communicate by a chipset of the communication device of FIG. 2 based on detecting a number of request signals higher than a threshold number.

At 1602, the application layer coexistence management module may determine that a first chipset of a computing device is communicating using a first protocol via a first antenna, wherein the first chipset is configured to communicate signals in a first frequency range.

At 1604, the application layer coexistence management module may identify, based at least in part on a default priority listing stored on the first chipset, a first priority level associated with the first protocol.

At 1606, the application layer coexistence management module may identify a plurality of request signals, sent from a second chipset of the computing device to the first chipset, indicating requests to communicate using a second protocol, wherein the second protocol is communicated in a second frequency range using a second antenna, wherein the first frequency range and the second frequency range at least partially overlap. In some examples, the second protocol may be associated with a second priority level that is lower than the first priority level.

At 1608, the application layer coexistence management module may determine that the plurality of request signals comprises a number of request signals higher than a threshold number. In some instances, the application layer coexistence management module may further determine that the first chipset has sent less than a threshold number of grant signals to the second chipset.

At 1610, the application layer coexistence management module may associate a third priority level with the second protocol, wherein the third priority level is higher than the first priority level.

Optionally, the application layer coexistence management module may include steps 1612-1616. At 1612, the application layer coexistence management module may receive another request signal separate from the plurality of request signals from the second chipset indicating a request to communicate using the second protocol. At 1614, the application layer coexistence management module may cause the first chipset to stop communicating using the first protocol. At 1616, the application layer coexistence management module may send a grant signal to the second chipset allowing the second chipset to communicate using the second protocol.

Figure 17:
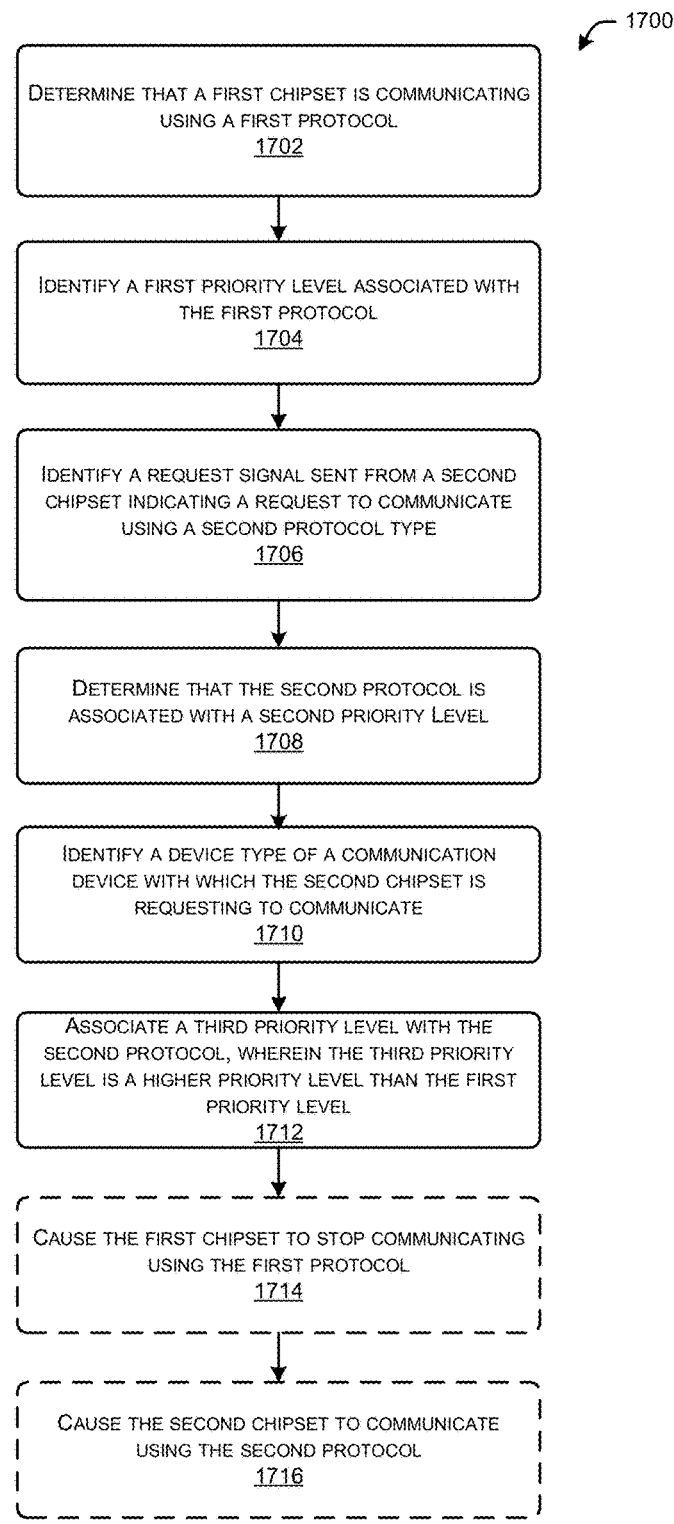
FIG. 17 is a flow diagram of an example process where an application layer coexistence management module modifies a priority level for a first protocol used to communicate by the communication device of FIG. 2 based on a type of secondary device communicating with the communication device.

FIG. 17 is a flow diagram of an example process 1700 where an application layer coexistence management module modifies a priority level for a first protocol used to communicate by the communication device 102 of FIG. 2 based on a type of secondary device communicating with the communication device.

At 1702, the application layer coexistence management module may determine that a first chipset of a computing device is communicating using a first protocol.

At 1704, the application layer coexistence management module may identify, based at least in part on a default priority listing encoded on the first chipset, a first priority level associated with the first protocol.

At 1706, the application layer coexistence management module may identify a request signal sent from a second chipset of the computing device to the first chipset indicating a request to communicate using the second protocol type.

At 1708, the application layer coexistence management module may determine that the second protocol is associated with a second priority level, wherein default priority listing indicates that the first priority level is a higher priority level than the second priority level.

At 1710, the application layer coexistence management module may identify a device type of a communication device that the second chipset is requesting to communicate with. At 1712, the application layer coexistence management module may associate a third priority level with the second protocol based at least in part on identifying the device type of the communication device, wherein the third priority level is a higher priority level than the first priority level.

In some examples, the application layer coexistence management module further includes operations 1714 and 1716. At 1714, the application layer coexistence management module may cause the first chipset to stop communicating using the first protocol. At 1716, the application layer coexistence management module may cause the second chipset to communicate using the second protocol.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:
   one or more processors;
   one or more first antennas;
   one or more second antennas;
   a first chipset, compatible with IEEE 802.11 standard and Bluetooth standard, to communicate signals in a first frequency range using a first protocol of the IEEE 802.11 standard for receiving data via the one or more first antennas;
   a second chipset, compatible with IEEE 802.15.4 standard, to communicate signals in a second frequency range using the one or more second antennas, wherein the first frequency range and the second frequency range at least partially overlap;
   a coexistence management component encoded on the first chipset and comprising a default priority listing indicating priorities for communications performed by the first chipset and the second chipset;
   one or more non-transitory computer-readable media storing computer-executable instructions that, when executed on the one or more processors, cause the one or more processors to perform acts comprising:
   monitoring an amount of audio data stored in an audio buffer;
   determining, based at least in part on the default priority listing, a first priority level associated with the first protocol;
   identifying a request from the second chipset to transmit data using the IEEE 802.15.4 standard;
   determining, based at least in part on the default priority listing, a second priority level associated with transmitting data using the IEEE 802.15.4 standard, wherein the first priority level is higher than the second priority level;
   determining that the amount of the audio data stored in the audio buffer is higher than a threshold; and
   based at least in part on determining that the amount of the audio data stored in the audio buffer is higher than the threshold, assigning a third priority level to the transmitting the data using the IEEE 802.15.4 standard, wherein the third priority level is higher than the second priority level.

2. The system as recited in claim 1, the acts further comprising:
   determining that the second chipset has finished transmitting the data using the IEEE 802.15.4 standard; and
   assigning the second priority level to the transmitting the data using the IEEE 802.15.4 standard.

3. The system as recited in claim 1, the acts further comprising determining a period of time to assign the third priority level to the transmitting the data using the IEEE 802.15.4 standard, and wherein the assigning the third priority level to the transmitting the data using the IEEE 802.15.4 standard comprises assigning the third priority level for the period of time.

4. The system as recited in claim 1, wherein the coexistence management component encoded on the first chipset is configured to perform acts comprising:
   determining that the first chipset is receiving additional audio data using the Bluetooth standard, wherein the receiving the additional audio data is associated with the first priority level;
   monitoring an amount of the additional audio data stored in an additional audio buffer;
   determining that the amount of the additional audio data is less than a threshold; and
   based at least in part on determining that the amount of the additional audio data is less than the threshold, assigning a fourth priority level to the receiving additional audio data, wherein the fourth priority level is higher than a priority level associated with transmitting data by the second chipset using the IEEE 802.15.4 standard.

5. The system as recited in claim 4, wherein the additional audio data is received using the 802.11 standard.

6. A method comprising:
   determining that a first chipset of a computing device is communicating using a first protocol via a first antenna, wherein the first chipset is configured to communicate signals in a first frequency range;
   identifying, based at least in part on a priority listing stored on the first chipset, a first priority level associated with the first protocol;
   identifying a plurality of request signals sent from a second chipset of the computing device to the first chipset, each request signal of the plurality of request signals indicating a request to communicate using a second protocol, wherein the second protocol is communicated in a second frequency range using a second antenna, wherein the first frequency range and the second frequency range at least partially overlap, wherein the second protocol is associated with a second priority level that is a lower priority level than the first priority level;

determining that the plurality of request signals comprises a number of request signals higher than a threshold number; and associating a third priority level with the second protocol, wherein the third priority level is higher than the first priority level.

7. The method of claim 6, further comprising:

receiving, from the second chipset, another request signal separate from the plurality of request signals indicating a request to communicate using the second protocol;

causing the first chipset to stop communicating using the first protocol; and sending a grant signal to the second chipset allowing the second chipset to communicate using the second protocol.

8. The method of claim 6, further comprising determining that less than a threshold number of grant signals have been sent to the second chipset, and wherein the associating the third priority level with the second protocol is based at least in part on the determining that less than the threshold number of grant signals have been sent to the second chipset.

9. The method of claim 6, wherein determining that the first chipset is communicating using the first protocol comprises determining that the first chipset is receiving an audio signal representing audio data; and the method further comprising storing the audio data in an audio buffer of the computing device.

10. The method of claim 6, further comprising:

determining to associate the third priority level with the second protocol for a period of time;

causing the first chipset to stop communicating using the first protocol; and sending a grant signal to the second chipset allowing the second chipset to communicate using the second protocol;

detecting an end of the period of time; and causing the second chipset to stop communicating using the second protocol.

11. The method of claim 6, wherein determining that the first chipset of the computing device is communicating using the first protocol comprises determining that the first chipset is communicating using at least one of a Bluetooth standard or an IEEE 802.11 standard.

12. The method of claim 6, wherein identifying the plurality of request signals sent from the second chipset of the computing device indicating requests to communicate using the second protocol comprises receiving the plurality of request signals sent from the second chipset of the computing device indicating requests to communicate using an 802.15.4 standard.

13. A computing device comprising:

one or more processors;

a first antenna;

a second antenna;

a first chipset to communicate signals in a first frequency range using the first antenna;

a second chipset to communicate signals in a second frequency range using the second antenna, wherein the first frequency range and the second frequency range at least partially overlap;

a coexistence management component encoded on the first chipset and comprising:

a priority listing indicating priorities for types of communications performed by the first chipset and the second chipset; and logic configured to determine, based on the priority listing, whether to allow the first chipset to communicate using a first protocol using the first antenna or to allow the second chipset to communicate using a second protocol using second antenna;

one or more non-transitory computer-readable media storing computer-executable instructions that, when executed on the one or more processors, cause the one or more processors to perform acts comprising:

determining that the first chipset is communicating using the first protocol;

identifying, based at least in part on the priority listing, a first priority level associated with the first protocol;

identifying a request signal sent from the second chipset to the first chipset indicating a request to communicate using the second protocol;

determining that the second protocol is associated with a second priority level, wherein the first priority level is higher than the second priority level;

identifying a device type of a communication device with which the second chipset is requesting to communicate using the second protocol; and based at least in part on identifying the device type of the communication device, associating a third priority level with the second protocol, wherein the third priority level is higher than the first priority level.

14. The computing device of claim 13, the acts further comprising:

causing the first chipset to stop communicating using the first protocol; and causing the second chipset to communicate using the second protocol.

15. The computing device of claim 14, the acts further comprising:

determining that the second chipset has finished communicating using the second protocol; and associating the second priority level with the second protocol.

16. The computing device of claim 13, the acts further comprising determining that the device type of the communication device indicates that the communication device is configured to send a request to communicate to the second chipset responsive to input from a user of the communication device.

17. The computing device of claim 13, wherein the coexistence management component comprises at least one of hardware-based instructions or firmware-based instructions associated with the first chipset.

18. The computing device of claim 13, wherein identifying the device type of the communication device comprises querying a database storing device addresses of secondary devices associated with the computing device.

19. The computing device of claim 13, wherein:

the first chipset comprises:

a first chip to communicate signals, via the first antenna, at the first frequency range using a first wireless technology standard; and a second chip to communicate signals, via the first antenna, at the first frequency range using a second wireless technology standard; and the second chip set comprises:

a third chip to communicate signals, via the second antenna, at the second frequency range using a third wireless technology standard.

20. The computing device of claim 13, wherein:
the first chipset comprises:
a first chip to communicate signals at the first frequency range using an 802.11 technology standard; and
a second chip to communicate signals at the first frequency range using a Bluetooth technology standard; and
the second chipset comprises a third chip to communicate signals at the second frequency range using an 802.15.4 technology standard.

* * * * *